United States Patent
Kubota et al.

(10) Patent No.: US 6,814,558 B2
(45) Date of Patent: Nov. 9, 2004

(54) BALL SCREW DEVICE AND INJECTION MOLDING MACHINE INCORPORATING THE SAME

(75) Inventors: Koji Kubota, Nagoya (JP); Yoshito Yamamoto, Nagoya (JP); Kazukiyo Kohno, Hiroshima (JP); Takeshi Ishiwada, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 198 days.

(21) Appl. No.: 10/115,026

(22) Filed: Apr. 4, 2002

(65) Prior Publication Data

US 2002/0160076 A1 Oct. 31, 2002

(30) Foreign Application Priority Data

Apr. 27, 2001 (JP) .................................... 2001-130542
Jun. 27, 2001 (JP) .................................... 2001-194245

(51) Int. Cl.[7] ............................................. B29C 45/77
(52) U.S. Cl. ...................................... 425/145; 425/149
(58) Field of Search ............................. 425/145, 149, 425/567

(56) References Cited

U.S. PATENT DOCUMENTS 4,487,087 A  12/1984  Johnstone
5,129,808 A   7/1992  Watanabe et al.

FOREIGN PATENT DOCUMENTS

| JP | 05138481    | 6/1993 |
| JP | 8-9184      | 1/1996 |
| JP | 2000-108175 | 4/2000 |
| JP | 2000185339  | 7/2000 |
| JP | 2000-185339 | 7/2000 |

*Primary Examiner*—Tim Heitbrink
(74) *Attorney, Agent, or Firm*—Oblon, Spivak, McClelland, Maier & Neustadt, P.C.

(57) ABSTRACT

The present invention provides a ball screw device for linear movement, which moves a working body by using a single of a plurality of ball screw shafts and ball screw nuts. In the ball screw device, a plurality of ball screw nuts are engaged threadedly with the same ball screw shaft. Also, one of the ball screw nuts on each ball screw shaft is attached to the working body via a fixed flange, the single fixed flange or one of the fixed flanges is provided with a load sensor, and other ball screw nuts serve as a fluid pressure supporting mechanism using a cylinder and a piston. A fluid pressure is controlled so that the support force of the fluid pressure supporting mechanism is equal to the pushing force detected by the load sensor. By this configuration, a large load can be distributed evenly to the ball screw nuts.

13 Claims, 20 Drawing Sheets

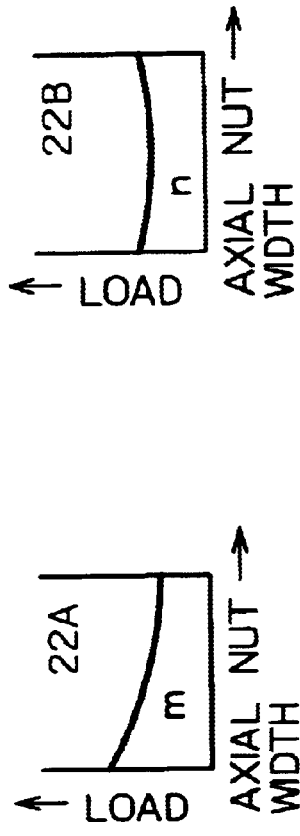
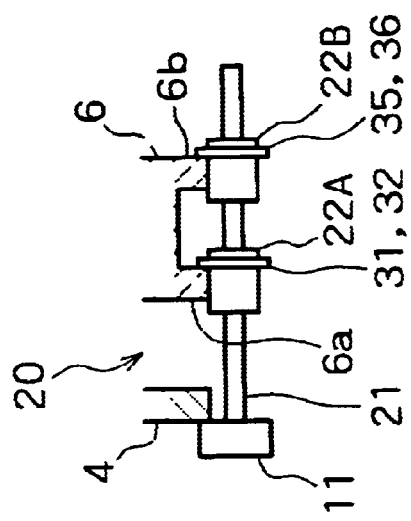

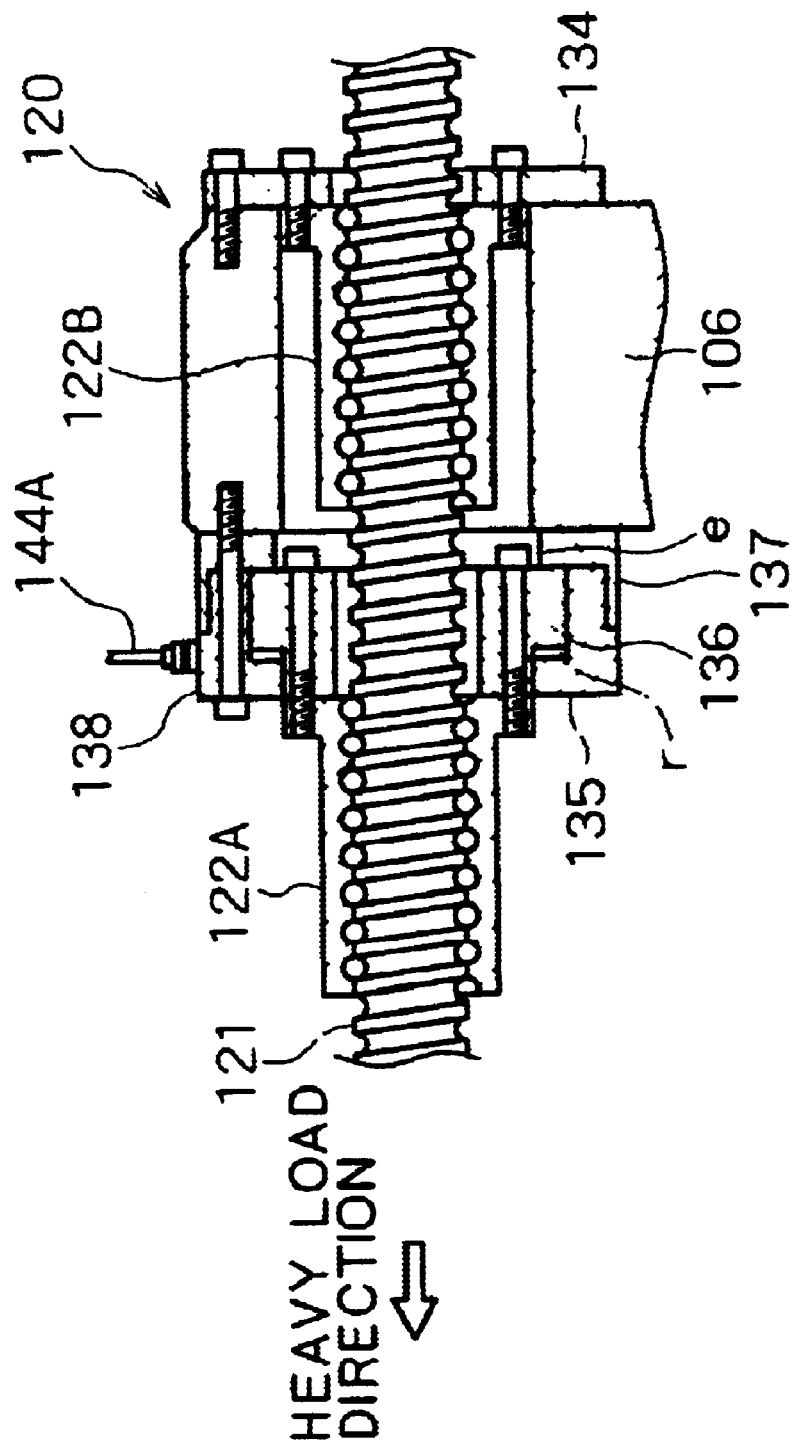

FIG. 19 (II)
RELATED ART
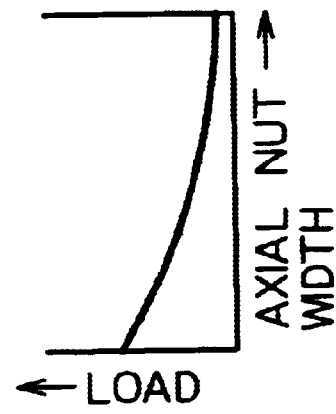
FIG. 19 (I)
RELATED ART
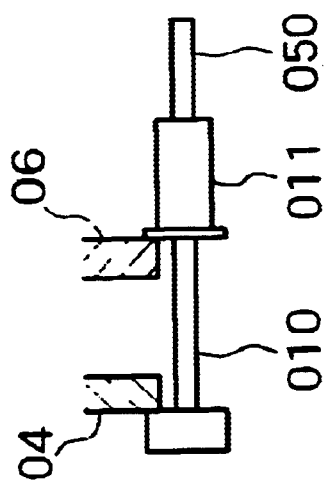

BALL SCREW DEVICE AND INJECTION MOLDING MACHINE INCORPORATING THE SAME

BACKGROUND OF THE INVENTION AND RELATED ART STATEMENT

1. Field of the Invention

The present invention relates to a ball screw nut support device for converting rotational motion into linear motion or a ball screw nut support device for inversely converting linear motion into rotational motion, and an injection molding machine incorporating the ball screw nut support device. More particularly, it relates to a support construction for a plurality of ball screw nuts that individually support a load in the one-side direction of a ball screw used for injection, mold opening/closing, mold clamping, and linear driving of an ejector etc. in an electric injection molding machine.

2. Description of Related Art

Conventionally, as a driving source for a straight movement axis of an injection molding machine, oil pressure has mainly been used. In recent years, however, electrical drive has often been used because of its advantage that the work environment is improved, the electric energy efficiency is increased, and the control of the velocity, position, and the like of a working portion is facilitated. Specifically, as a driving source for injection drive of an injection screw, platen movement of mold clamping device, mold clamping, and linear movement of the ejector etc., an electric servomotor and a ball screw construction having the highest mechanical efficiency for converting the rotation of the motor into linear drive have been used.

Some electric injection driving unit for the conventional injection molding machine has one or two drive motors. In the case where one drive motor is provided, a pair of screws and nuts for converting the rotation into linear motion are provided symmetrically on both sides of the injection screw to balance the driving force, and the power is transmitted by a toothed belt for transmission or a gear train (for example, see an injection device of an injection molding machine disclosed in Japanese Patent Publication No. 8-9184 (No. 9184/1996)).

Although the above-described conventional electric injection driving unit has no problem when being used for a small-sized injection molding machine, when being used for an injection molding machine of a middle or larger size, a pressure required for injection at the time of injection is very high, so that a specially designed motor is needed to deliver high torque, and therefore it has a problem in that not only the cost is high but also the arrangement balance at the time of mounting of injection molding machine is bad.

In the injection drive of injection molding machine, when molten resin stored at the tip end of the injection screw is pushed rapidly into a mold cavity by advancing the injection screw, the injection screw requires a great pushing force. Therefore, when a ball screw is used for injection drive, the load is high in the one-side direction of straight reciprocating drive caused by the ball screw, so that the allowable maximum loading force of the ball screw is selected so as to correspond to the pushing force at the time of injection drive. Also, the loading force of ball screw is calculated by the pressure withstanding the rolling of a ball held between a screw groove and a ball nut groove, and the loading capacity in designing is calculated assuming that an even pressure is applied to working balls on the working spiral of screw.

In the case where a ball screw is used for the injection drive of a small-sized injection molding machine, even if a ball screw of a size having a loading capacity corresponding to the driving force of ball screw or a ball screw of a size exceeding the loading capacity is selected, the ball screw can be selected from commercially available standard sizes, so that the cost of ball screw device scarcely poses a problem. However, when the injection pressure increases in an injection molding machine of a middle or larger size, the size of ball screw becomes out-of-standard, so that the cost presents a big problem, and thus limit design is required.

When a high tensile force is applied in the axial direction of a ball screw shaft, the ball screw shaft elongates in its portion between a bearing on the fixed side and a ball nut, and the ball nut is also elongated or contracted by the axial force. Therefore, the screw pitch on the screw side of ball screw shifts from that on the ball nut side thereof, and thus the pressure received by the ball changes depending on the axial position.

FIG. 18 shows a conventional ball screw device disclosed in Japanese Patent Provisional Publication No. 2000-108175 (No. 108175/2000). This ball screw device is constructed so that a ball screw shaft 010 is rotated by being driven on the left-hand fixed side, not shown, and is restrained axially by a strong thrust bearing, so that a moving frame 06 connected to an injection screw by a ball screw of the ball screw shaft 010 is pushed by a ball screw nut 011 and thereby is moved in the injection direction indicated by an arrow mark. Reference numeral 59 denotes a flange-shaped pressure sensor (load cell).

In the construction of this ball screw device, as shown in a schematic view of FIG. 19-(I) and a characteristic graph of FIG. 19-(II) showing load as a function of axial nut width, the load received by a ball increases toward the working end of the ball nut 011. Since the capacity of a ball screw 050 increases, even if the length of the ball nut 011 is increased, deformation is greater at the end of the nut 011, and a tendency for the load at the working end to increase cannot be avoided. Reference numeral 04 denotes a fixed-side member that pivotally supports the ball screw shaft 010 via a bearing.

A ball screw device for injection drive of injection molding machine, which has been disclosed in Japanese Patent Provisional Publication No. 2000-185339 (No. 185339/2000), is constructed as described below. As shown in FIG. 20, a plurality of ball nuts 052, 053, which fit on a ball screw shaft 051 driven by an electric motor, are disposed in series on one ball screw shaft, and fluid pressure cylinders 054 and 055 for transmitting a thrust from the ball nuts 052 and 053 to a movable member 060 of an electric injection molding machine are connected to the ball nuts 052 and 053, respectively. Further, the cylinder chambers of the fluid pressure cylinders 054 and 055 are connected to each other by a communicating tube 056. In this ball screw device, a load applied to the ball screw shaft 051 is distributed evenly to the ball nuts 052, 053 so that the service life of the ball screw shaft 051 is prolonged.

As explained in the above-described conventional example, if an attempt is made to increase the length of the ball nut to obtain a ball screw nut of high load, the deformation in the end portion of nut increases, so that the load on the working end side tends to increase more and more. Also, the ball screw device constructed so that a plurality of ball nuts are threadedly engaged with the ball screw shaft in series, a working body is connected to each of the ball nuts via the fluid pressure cylinder, and the cylinder chambers of the fluid pressure cylinders are connected to each other by the communicating tube is capable of evenly distributing a load applied to the nut. In this ball screw device, however, the fluid may leak from the fluid pressure cylinder, or the position of ball nut may be changed by the compression of oil due to pipe volume, so that the injection screw may be incapable of keeping the proper positions of injection start and end.

OBJECT AND SUMMARY OF THE INVENTION

An object of the present invention is to provide a ball screw device in which an even load is applied to each of a plurality of ball screw nuts without a change of attachment position of the ball screw nut with respect to a working body. Also, another object of the present invention is to provide a ball screw device in which a plurality of ball screw nuts can share a heavy load of a ball screw shaft without a change of attachment position of the ball screw nut with respect to a working body.

The present invention solves the above problems by using measures featuring the configurations of the following items:

(1) A ball screw device which converts the rotation of a ball screw shaft whose thrust direction is restrained by a fixed member into linear movement of a ball screw nut engaging threadedly with the ball screw shaft to move a working body connected to the ball screw nut, wherein the ball screw device comprises a plurality of ball screw nuts which engage threadedly with the ball screw shaft; a sensor carrying flange which attaches one of the ball screw nuts to the working body; a load sensor which is mounted on the sensor carrying flange; an annular fluid pressure piston which is attached to the ball screw nut other than the one ball screw nut; a fluid pressure cylinder, which is attached to the working body and is open on one side, having an annular groove portion in which the piston fits in a fluid-tight manner to form a fluid pressure actuator; and a fluid pressure control unit which is provided on the fluid pressure cylinder to control the fluid pressure so as to produce a piston pushing force equal to the detected load of the load sensor, so that a load is applied to the working body, the load is distributed evenly to the ball screw nuts.

(2) A ball screw device of a plurality of rows, in which a plurality of ball screw shafts whose thrust direction is restrained by a fixed member are provided in parallel, the ball screw shafts are rotated synchronously to be subjected to an even load, and a working body connected to a ball screw nut engaging threadedly with the ball screw shaft is moved linearly, wherein the ball screw device comprises a plurality of ball screw nuts which engage threadedly with each of the ball screw shafts; a sensor carrying flange which attaches one of all of the ball screw nuts to a working body; a load sensor which is mounted on the sensor carrying flange; an attachment flange which directly attaches the working body to one of the ball screw nuts on the ball screw shaft other than the ball screw shaft with which the ball screw nut having the load sensor engages; an annular fluid pressure piston which is attached to the ball screw nut other than the one ball screw nut; a plurality of fluid pressure cylinders, each of which is attached to the working body and has an annular groove portion in which the piston fits in a fluid-tight manner to form a fluid pressure actuator; a fluid pressure control unit which controls each fluid pressure of each of the cylinders so as to produce a piston pushing force equal to the detected load of the load sensor; and a pipe which transmits the fluid pressure controlled by the fluid pressure control unit to the fluid pressure cylinders, so that a load is applied to the working body, the load is distributed evenly to the ball screw nuts.

(3) The ball screw device described in the above item (2), wherein the fluid pressure sent to each of the fluid pressure cylinders is controlled so that a piston pushing force equal to the detected load of the load sensor is produced, the fluid pressure pipes to each cylinder are caused to communicate with each other so that an equal fluid pressure is applied to each of the cylinders, so that a load is applied to the working body, the load is distributed evenly to the ball screw nuts.

(4) A ball screw device which converts the rotation of a ball screw shaft whose thrust direction is restrained by a fixed member into linear movement of a ball screw nut engaging threadedly with the ball screw shaft to move a working body connected to the ball screw nut, wherein the ball screw device comprises a plurality of ball screw nuts which engage threadedly with the ball screw shaft; a load sensor which is installed on the working body or the fixed member to detect a load on the working body; an attachment flange which directly connects one of the ball screw nuts to the working body; an annular fluid pressure piston attached to the ball screw nut other than the ball screw nut connected to the attachment flange; a plurality of fluid pressure cylinders, each of which is attached to the working body and has an annular groove portion in which the piston fits in a fluid-tight manner to form a fluid pressure actuator; and a fluid pressure control unit which controls the fluid pressure of each of the fluid pressure cylinders so as to produce a piston pushing force equal to a value obtained by dividing the load detected by the load sensor of the working body by the number of ball screw nuts, so that a load is applied to the working body, the load is distributed evenly to the ball screw nuts.

(5) A ball screw device of a plurality of rows, in which a plurality of ball screw shafts whose thrust direction is restrained by a fixed member are provided in parallel, the ball screw shafts are rotated synchronously to be subjected to an even load, and a working body connected to a ball screw nut engaging threadedly with the ball screw shaft is moved linearly, wherein the ball screw device comprises a plurality of ball screw nuts which engage threadedly with each of the ball screw shafts; a load sensor which is installed on the working body or the fixed member to detect a load on the working body; an attachment flange which directly connects one of the ball screw nuts located on the same shaft of each of the ball screw shafts to the working body; an annular fluid pressure piston attached to the ball screw nut other than the ball screw nut connected to the attachment flange; a plurality of fluid pressure cylinders, each of which is attached to the working body and has an annular groove portion in which the piston fits in a fluid-tight manner to form a fluid pressure actuator; and a fluid pressure control unit which controls the fluid pressure of each of the fluid pressure cylinders so as to produce a piston pushing force equal to a value obtained by dividing the load detected by the load sensor of the working body by the total number of ball screw nuts, so that a load is applied to the working body, the load is distributed evenly to the ball screw nuts.

(6) The ball screw device described in the above item (5), wherein a fluid pressure corresponding to a value obtained by dividing the load detected by the load sensor of the working body by the total number of ball screw nuts is calculated, fluid pressure pipes to each cylinder are caused to communicate with each other so that an equal fluid pressure is applied to each of the cylinders, the working fluid pressure is controlled so as to have a value obtained by dividing the load detected by the load sensor by the total number of ball screw nuts, so that a load is applied to the working body, the load is distributed evenly to the ball screw shafts and the ball screw nuts.

(7) An injection molding machine in which a plurality of ball screw devices, each of which is provided with a plurality of ball screw nuts of a fluid pressure even sharing type described in any one of the above items (2), (3), (5) and (6) to effect straight injection drive of an injection screw of the injection molding machine, are provided in parallel to an injection screw shaft, so that all of the ball screw nuts can share the load.

The present invention provides the ball screw device for linear movement which moves the working body by using a single ball screw shaft or a plurality of ball screw shafts and ball screw nuts. In the ball screw device, a plurality of ball screw nuts are engaged threadedly with the same ball screw shaft. Also, one of the ball screw nuts on each ball screw shaft is attached to the working body via the fixed flange, the single fixed flange or one of the fixed flanges is provided with the load sensor, and other ball screw nuts serve as a fluid pressure supporting mechanism using a cylinder and a piston. A fluid pressure is controlled so that the support force of the fluid pressure supporting mechanism is equal to the pushing force detected by the load sensor. By this configuration, a large load can be distributed evenly to the ball screw nuts, and therefore the ball screw nut of a small, short and a standard size can be used, the cost can be reduced. Also, the fluid pressure supporting mechanism of the ball screw nut can cover a difference in pitch between the ball screw shaft and the ball screw nut, which achieves an effect of improving the reliability and durability of the ball screw nut. Also, since one of the ball screw nuts on each ball screw shaft is attached to the working body via the fixed flange, there is achieved an effect of maintaining the reproducibility of the original position of the ball screw nut with respect to the ball screw shaft when the working body returns (claims 1 and 2).

If the working fluid pipe for the fluid pressure supporting mechanism of the ball screw nut is made common, the fluid pressure control circuit is simple, which achieves an effect of reducing the cost (claim 3).

Also, the present invention provides the ball screw device for linear movement which moves the working body by using a single ball screw shaft or a plurality of ball screw shafts and ball screw nuts, in which the sensor for detecting all driving forces is provided on the fixed member for supporting the working body or the driving force of the working body; a plurality of ball screw nuts are engaged threadedly with the same ball screw shaft; one of the ball screw nuts on each ball screw shaft is attached to the working body via the fixed flange, and other ball screw nuts serve as a fluid pressure supporting mechanism using a cylinder and a piston; and a fluid pressure is controlled so that the support force of the fluid pressure supporting mechanism is equal to the value obtained by dividing the pushing force detected by the driving force sensor by the total number of ball screw nuts. According to this ball screw device, a large load can be distributed evenly to the ball screw nuts, and therefore the same effect as described above is achieved (claims 4 and 5).

If the working fluid pipe for the fluid pressure supporting mechanism of the ball screw nut is made common, the fluid pressure control circuit is simple, which achieves an effect of reducing the cost (claim 6).

The ball screw device in accordance with the present invention is suitably used for electric force drive that requires a large pushing force only in the one-side direction of reciprocating movement, such as injection drive (claim 7).

The present invention of another aspect solves the above problems by using measures featuring the configurations of the following items:

(8) A ball screw device which converts the rotation of a ball screw shaft whose thrust direction is restrained by a fixed member into linear movement of a ball screw nut engaging threadedly with the ball screw shaft, and has a load configuration such that the load for moving a working body connected to the ball screw nut in the one-side direction is considerably larger than the load for moving the working body in the opposite direction, wherein the ball screw device comprises a first ball screw nut provided on the working body so that an attachment flange is located on the side opposite to the heavy load direction of the ball screw shaft; an oil pressure cylinder fixedly provided on the working body; an oil pressure piston which is fitted in the oil pressure cylinder in a fluid-tight manner and is attached to the first ball screw nut; an oil pressure source which applies a predetermined oil pressure to a ring-shaped oil pressure chamber formed by the oil pressure piston and the oil pressure cylinder; and a second ball screw nut installed fixedly to the working body so that the attachment flange is located on the side opposite to the heavy load direction of the ball screw shaft, and the ring-shaped oil pressure chamber is filled with a working fluid of a predetermined pressure and holds it, and a pre-load of a predetermined percentage of the maximum load is always applied to the working body, so that at the time of the maximum load, the two ball screw nuts share the maximum load of the ball screw shaft.

(9) A ball screw device which converts the rotation of a ball screw shaft whose thrust direction is restrained by a fixed member into linear movement of a ball screw nut engaging threadedly with the ball screw shaft, and has a load configuration such that the load for moving a working body connected to the ball screw nut in the one-side direction is considerably larger than the load for moving the working body in the opposite direction, wherein the ball screw device comprises a first ball screw nut provided on the front side of the working body so that an attachment flange is located on the side opposite to the heavy load direction of the ball screw shaft; an oil pressure cylinder fixedly provided on the working body; an oil pressure piston which is fitted in the oil pressure cylinder in a fluid-tight manner and is attached to the first ball screw nut; an oil pressure source which applies a predetermined oil pressure to a ring-shaped oil pressure chamber formed by the oil pressure piston and the oil pressure cylinder; and a second ball screw nut installed fixedly to the rear side of the working body so that the attachment flange is located on the side opposite to the heavy load direction of the ball screw shaft, and the ring-shaped oil pressure chamber is filled with a working fluid of a predetermined pressure and holds it, and a pre-load of 40 to 50% of the maximum load is always applied to the working body, so that at the time of the maximum load, the two ball screw nuts share the maximum load of the ball screw shaft.

(10) A ball screw device which converts the rotation of a ball screw shaft whose thrust direction is restrained by a fixed member into linear movement of a ball screw nut engaging threadedly with the ball screw shaft, and has a load configuration such that the load for moving a working body connected to the ball screw nut in the one-side direction is considerably larger than the load for moving the working body in the opposite direction, wherein the ball screw device comprises a first ball screw nut provided on the working body so that an attachment flange is located on the side opposite to the heavy load direction of the ball screw shaft; an elastic element provided so as to be held between the working body and a ring plate attached to the first ball screw nut; and a second ball screw nut installed fixedly to the working body so that the attachment flange is located on the side opposite to the heavy load direction of the ball screw shaft, and the elastic element is installed in a pre-loaded state so that the compressive force is a predetermined percentage of the maximum load, and at the time of the maximum load, the two ball screw nuts share the maximum load of the ball screw shaft.

(11) A ball screw device which converts the rotation of a ball screw shaft whose thrust direction is restrained by a fixed member into linear movement of a ball screw nut engaging threadedly with the ball screw shaft, and has a load configuration such that the load for moving a working body connected to the ball screw nut in the one-side direction is considerably larger than the load for moving the working body in the opposite direction, wherein the ball screw device comprises a first ball screw nut provided on the front side of the working body so that an attachment flange is located on the side opposite to the heavy load direction of the ball screw shaft; an elastic element provided so as to be held between the working body and a ring plate attached to the first ball screw nut; and a second ball screw nut installed fixedly to the rear side of the working body so that the attachment flange is located on the side opposite to the heavy load direction of the ball screw shaft, and the elastic element is installed in a pre-loaded state so that the compressive force is 40 to 50% of the maximum load, and at the time of the maximum load, the two ball screw nuts share the maximum load of the ball screw shaft.

(12) The ball screw device described in the above item (9), wherein the ball screw device further comprises a load sensor installed on a member subjected to the load of the ball screw shaft; and a control valve for controlling a pressure oil sent to the ring-shaped oil pressure chamber on the basis of the detected value of the sensor, and when the detected value is ½ (50%) or more of the maximum load, the oil pressure chamber is filled with the pressure oil of a predetermined pressure and holds it, and 40 to 50% of the maximum load is applied to the working body, whereby at the time of the maximum load, the two ball screw nuts share the maximum load of the ball screw shaft.

(13) An injection molding machine in which a plurality of ball screw devices, each of which is provided with a plurality of ball screw nuts of a fluid pressure sharing type described in any one of the above items (8) to (12) to effect straight injection drive of an injection screw of the injection molding machine, are provided in parallel to an injection screw shaft, so that all of the ball screw nuts can share the load.

The present invention is configured as described below. In the case where the load for moving a working body in the one-side direction of the ball screw device is considerably larger than the load for moving the working body in the opposite direction, the two sets of ball screw nuts are engaged threadedly so that the attachment flange is located on the rear side with respect to the heavy load direction of the ball screw shaft. One of the ball screw nuts is installed fixedly to the working body, and the other thereof is installed via loading means (an oil pressure mechanism consisting of an oil pressure cylinder and a piston, or an elastic element) such that a pressure of a predetermined percentage of the maximum load is always applied to the working body, so that the two ball screw nuts share the maximum load at the time of the maximum load. Therefore, no complex oil pressure control is needed, and therefore only an oil pressure source for generating a fixed oil pressure and a pressure regulating valve, or only a simple elastic element and an elastic force regulating mechanism are needed. Moreover, a ball screw nut of a standard size can be used, which brings down the cost.

Also, the ball screw device of the present invention uses a system in which a load is detected by the sensor, and when the detected value is ½ (50%) or more of the maximum load, a pre-load of 40 to 50% of the maximum load is applied. Thereby, the life of the ball screw nut on the pre-load side can be prolonged.

Furthermore, the fluid pressure supporting mechanism or the elastic element supporting mechanism of the ball screw nut can cover an error of attachment angle between the ball screw nut and the working body, which achieves an effect of improving the reliability and durability of the ball screw nut. Also, since one of the ball screw nuts on each ball screw shaft is attached to the working body via the fixed flange, and a pre-load is always applied to between the ball screw nut and the working body, there is achieved an effect of maintaining the reproducibility of the original position of the ball screw nut with respect to the ball screw shaft when the working body returns to the original position.

The ball screw device in accordance with the present invention is suitably used for electric force drive that requires a large pushing force only in the one-side direction of reciprocating movement, such as injection drive.

BRIEF DESCRIPTION OF THE DRAWINGS

FIG. 9-(I) is a schematic view of the ball screw device shown in FIG. 1, and

FIGS. 9-(II) and 9-(III) are graphs showing a load received by a ball with respect to the axial direction of a ball screw nut;

FIG. 10 is a side sectional view of a ball screw device in accordance with a first embodiment of another aspect of the present invention;

FIGS. 14-(II) and 14-(III) are graphs showing a load received by a ball with respect to the axial direction of a ball screw nut;

FIG. 19-(I) is a schematic view of the conventional ball screw device shown in FIG. 18, and FIG. 19-(II) is a graph showing a load received by a ball with respect to the axial direction of a ball screw nut.

DETAILED DESCRIPTION OF PREFERRED EMBODIMENTS

[First Embodiment]

Figure 1:
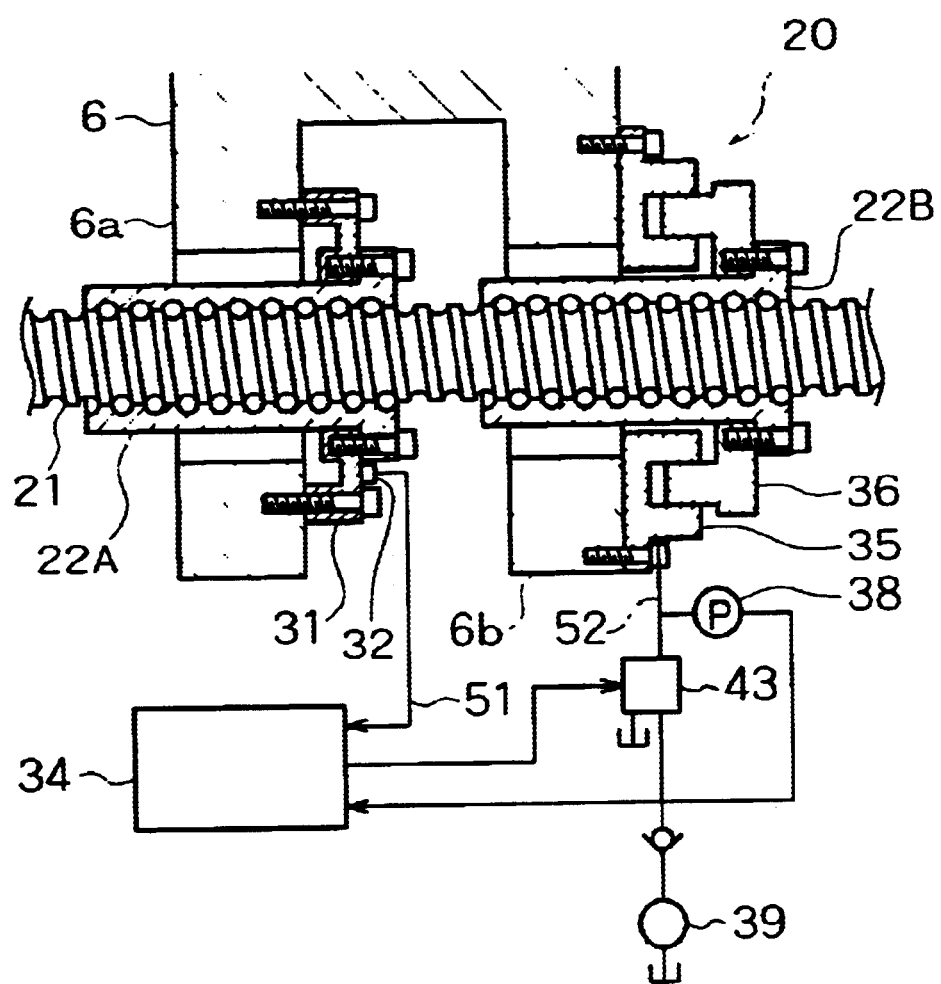
FIG. 1 is a side sectional view of a ball screw device in accordance with a first embodiment of the present invention.

A first embodiment of the present invention will now be described with reference to the accompanying drawings. In this embodiment, oil is used as a working fluid, and equipment for oil pressure control unit such as an oil hydraulic pump and an oil pressure control valve is used. FIG. 1 is a side sectional view of a ball screw device, FIG. 2 is a schematic view of an oil pressure control unit for the ball screw device shown in FIG. 1, FIG. 9-(I) is a schematic view of the ball screw device shown in FIG. 1, and FIGS. 9-(II) and 9(III) are graphs showing a load received by a ball with respect to the axial direction of a ball screw nut.

A ball screw device 20 shown in FIG. 1 includes a ball screw shaft 21, two sets of ball screw nuts 22A and 22B engaging threadedly with the ball screw shaft 21, which are attached to nut attachment portions 6a and 6b of a moving frame 6 (working body), a load sensor carrying flange 31 which is interposed between the ball screw nut 22A and the moving frame (working body) 6 when the ball screw nut 22A is installed, and an oil pressure cylinder 35 and an oil pressure piston 36 which are interposed between the ball screw nut 22B and the moving frame 6 when the ball screw nut 22B is installed. In a proper position of the load sensor carrying flange 31, a load sensor (load cell) 32 capable of detecting a load of the ball screw nut 22A is installed. The load detected by the load sensor 32 is sent to a control unit 34 and is converted into an oil pressure, the converted oil pressure being transmitted to an oil pressure control valve 43. When the converted oil pressure is applied to the oil pressure cylinder 35, the force received by the oil pressure piston 36 is controlled so as to be always equal to the load detected by the load sensor 32.

Figure 2:
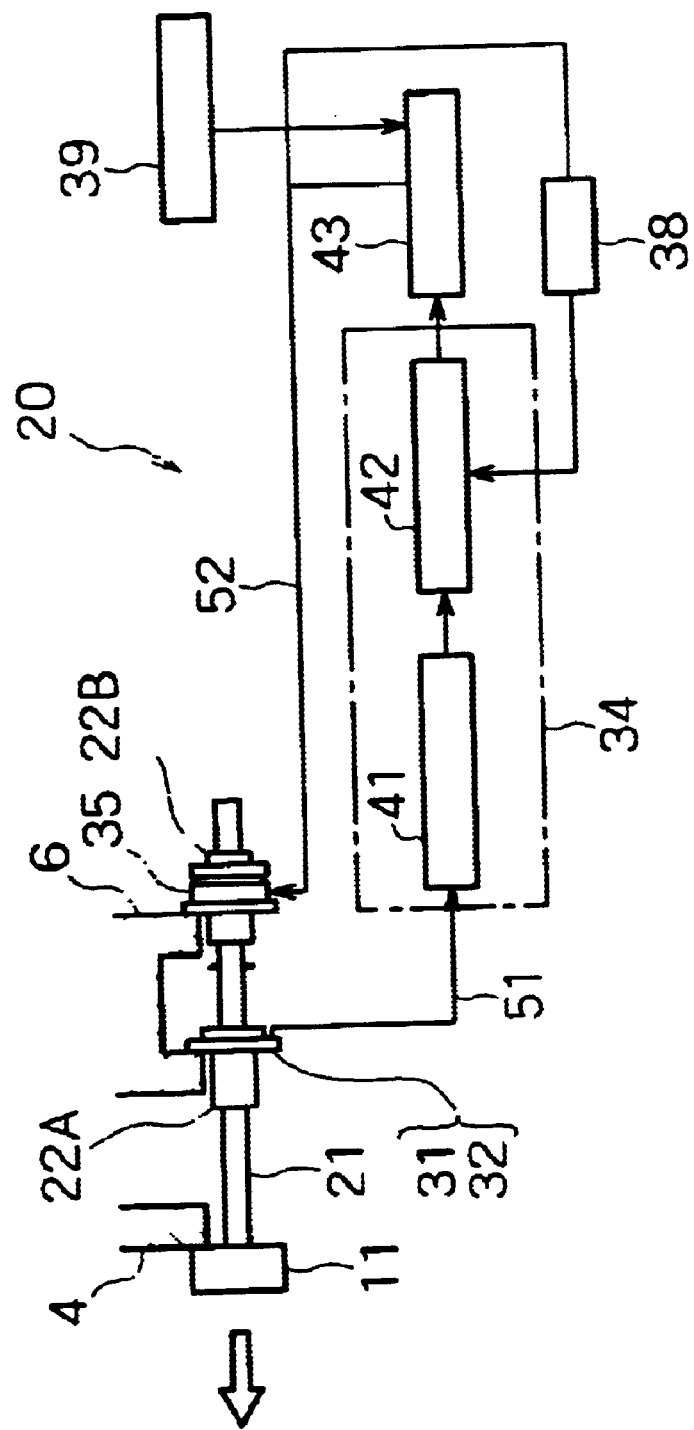
FIG. 2 is a schematic view of an oil pressure control unit for the ball screw device shown in FIG. 1.

As shown in a schematic view of FIG. 2, when a servomotor 11 rotationally drives the ball screw shaft 21 to draw the moving frame 6 in the arrow-marked direction via the ball screw nuts 22A and 22B, the load detected by the load sensor 32 on the load sensor carrying flange 31 to which the ball screw nut 22A is attached is converted into a hydraulic signal by an oil pressure conversion circuit 41 of the control unit 34 via a signal line 51. The hydraulic signal controls a hydraulic oil for the oil pressure cylinder 35 by a PID control circuit 42 via the oil pressure control valve 43 so as to have this oil pressure value (or a value that is proportional to this oil pressure value), and the hydraulic oil is sent to the oil pressure cylinder 35 via a pipe 52. Therefore, the ball screw nuts 22A and 22B bear an even load (or load of a fixed ratio).

The load sensor carrying flange 31 has high rigidity and therefore is scarcely deformed even if an axial load is applied, so that the ball screw nut 22A attached to this flange 31 can maintain the set position with respect to the ball screw shaft 21. Also, an oil chamber of the oil pressure cylinder 35 to which the ball screw nut 22B is attached can cover a difference in pitch between the ball screw shaft 21 and the ball screw nut 22B.

Figure 18:
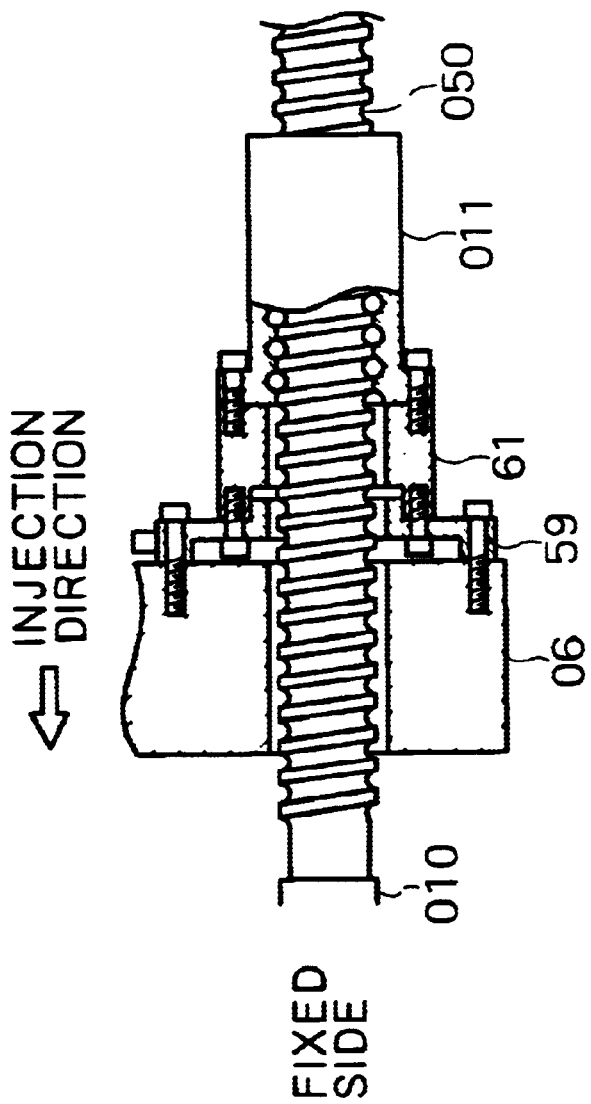
FIG. 18 is a side sectional view of a conventional ball screw device.
Figure 20:
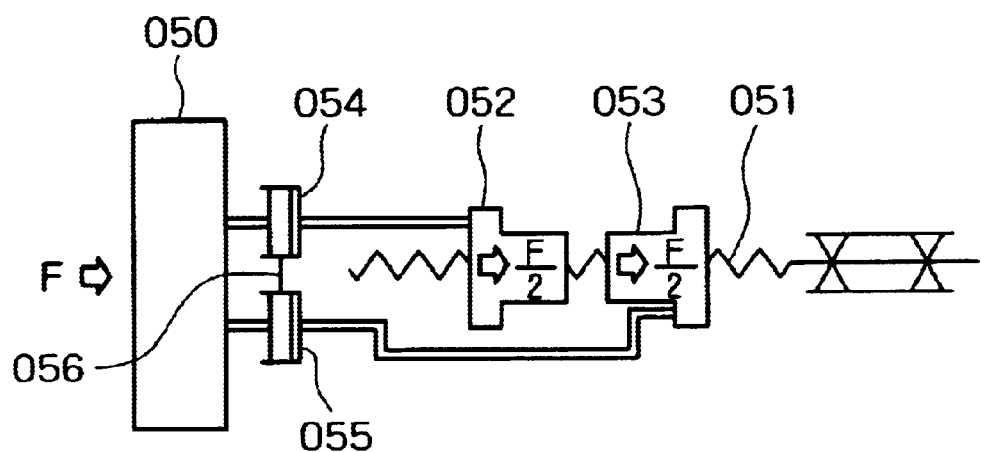
FIG. 20 is a schematic view showing the construction of another conventional ball screw device.

As shown in FIG. 9-(I), when the ball screw nut 22A and the ball screw nut 22B incorporating an oil pressure cylinder function are arranged on the ball screw shaft 21 in series and are installed to the moving frame 6, the calculated values of loads received by a ball with respect to the axial direction of the ball screw nuts 22A and 22B are as shown in FIGS. 9-(II) and 9-(III), and are equal to areas m and n obtained by integrating the load received by the ball in the axial direction, respectively. Comparing FIGS. 9-(II) and 9-(III) showing the load received by the ball with FIG. 19(II) showing the calculated value of a load received by a ball with respect to the axial direction of a conventional ball screw nut 011 shown in FIG. 18, it is found that the maximum value of the load received by the ball is apparently small.

[Second Embodiment]

Figure 3:
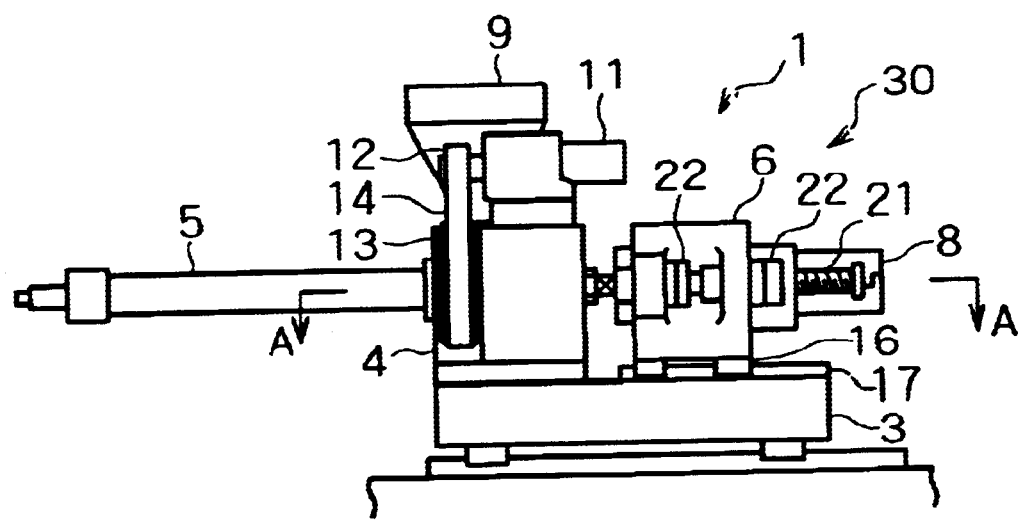
FIG. 3 is a general side view of an injection molding machine provided with an electric injection driving unit in accordance with a second embodiment of the present invention.
Figure 4:
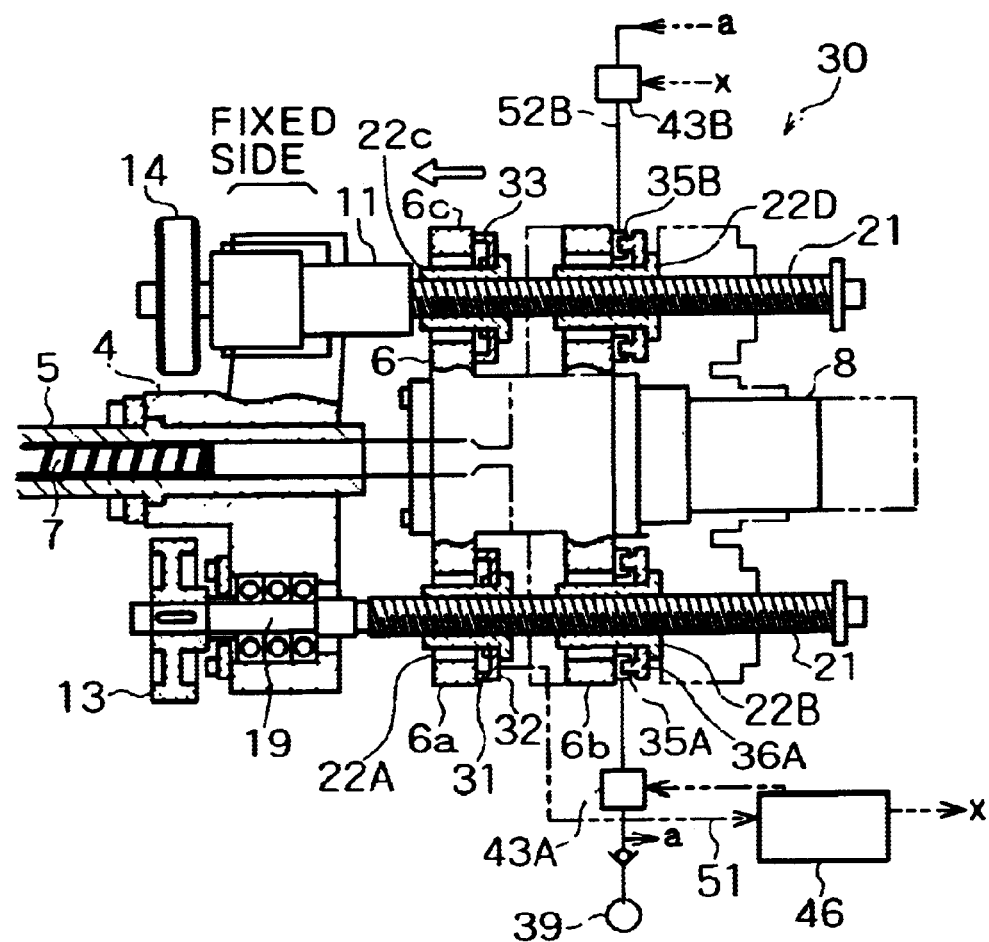
FIG. 4 is an enlarged sectional view of a ball screw portion taken along the line A—A of the injection molding machine shown in FIG. 3.
Figure 5:
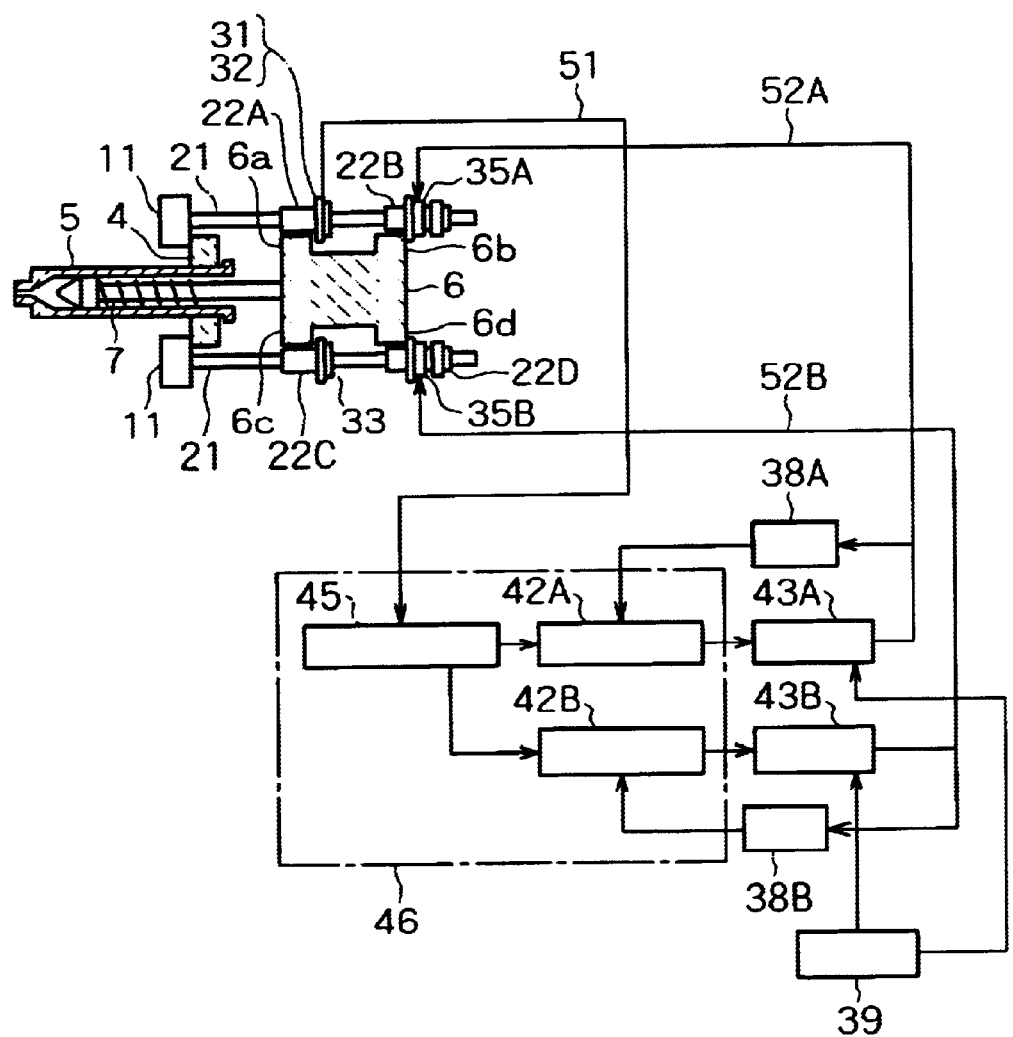
FIG. 5 is a schematic view of an oil pressure control unit for the ball screw device shown in FIG. 4.

A second embodiment of the present invention will now be described with reference to the accompanying drawings. FIG. 3 is a general side view of an injection molding machine provided with an electric injection driving unit using the ball screw device shown in FIG. 1, FIG. 4 is an enlarged sectional view of a ball screw portion taken along the line A—A of the injection molding machine shown in FIG. 3, and FIG. 5 is a schematic view of an oil pressure control unit for the ball screw device shown in FIG. 4. The outline of an injection molding machine 1 using two sets of ball screw devices 20 shown in FIG. 1 for injection drive and the construction of a ball screw device 30 (the ball screw device 30 is a device composed of two sets of ball screw devices 20 and parts around the ball screw devices 20) will be explained. This electric injection driving unit is an injection driving unit for an injection molding machine 1 which is constructed so that it performs resin feed of an injection screw 7 and plasticization by means of the dive of an electric motor 8, and at the same time, converts the rotation of two electric motors 11 provided separately into linear motion while carrying out synchronous control, by which the two linear motions are applied to the injection screw 7 at the same time to effect injection advance and retreat.

Referring to FIGS. 3 and 4, a fixed frame 4 is fixedly provided on a driving unit base 3, and the proximal portion of an injection cylinder 5 is installed to the side of the fixed frame 4. The moving frame 6 is constructed so as to be movable in the horizontal injection direction via linear bearings 18 on rails 17 installed on the upper surface of the driving unit base 3. At the rear of the moving frame 6, the motor 8 with reducing gears for rotationally driving the injection screw 7 (for resin feed and plasticization) is installed.

Above the fixed frame 4 are installed a pair of injection driving motors 11, 11, and a small pulley 12 is installed on the output shaft of each of the motors 11 in such a manner that the direction of rotation is restricted by a key. These injection driving motors 11 are motors with reducing gears. The ball screw shafts 21, 21 of the ball screw device 30 are installed to the fixed frame 4 via a high-capacity angular contact bearing 19 so as to be rotatable and capable of taking a great thrust. Also, at the tip ends of the paired ball screw shafts 21, 21, large pulleys 13 are installed in such a manner that the direction of rotation is restricted by a key.

The rotation of the injection driving motors 11, 11 is transmitted to the ball screw shafts 21, 21 via the small pulley 12, a toothed belt 14 and the large pulley 13. The ball screw shafts 21, 21 are configured so as to be rotated synchronously by a synchronization control unit, not shown. A distance between the axes of the ball screw shaft 21, 21 and the injection cylinder 5 is set equal, and the driving torque of the two ball screw shafts 21, 21 is controlled so as to be equal.

The paired ball screw nuts 22A and 22B engaging threadedly with the ball screw shaft 21 are installed to the ball screw nut attachment portions 6a and 6b at both sides of the moving frame 6. As in the case of the ball screw device 20, the ball screw nut 22A is installed to the ball screw nut attachment portion 6a via the load sensor carrying flange 31, and the ball screw nut 22B is installed to the attachment portion 6b via an oil pressure cylinder 35A and an oil pressure piston 36A. As shown in the schematic view of FIG. 5 and a control circuit of an oil pressure control unit 46, the load sensor 32 attached to the load sensor carrying flange 31 detects a load of the ball screw nut 22A, and the detected value is converted into a hydraulic signal by an oil pressure conversion/distribution circuit 45. The hydraulic signal controls a hydraulic oil for the oil pressure cylinder 35A by a PID control circuit 42A via an oil pressure control valve 43A so as to have this oil pressure value, and the controlled hydraulic oil for the oil pressure cylinder 35A is sent to the oil pressure cylinder 35A via a pipe 52A. Therefore, the ball screw nuts 22A and 22B bear an equal load. The pipe 52A is provided with an oil pressure indicator 38A for detecting the pressure in the pipe.

To a ball screw nut attachment portion 6c is attached a ball screw nut 22C via a flange 33 having the same shape as that of the load sensor carrying flange 31, and to a ball screw nut attachment portion 6d is attached a ball screw nut 22D via an oil pressure cylinder 35B and an oil pressure piston 36B. Based on the hydraulic signal converted and distributed from the detected value of the load sensor 32 by the oil pressure conversion/distribution circuit 45, the hydraulic oil for the oil pressure cylinder 35B is controlled by a PID control circuit 42B via an oil pressure control valve 43B so as to have this oil pressure value, and the controlled hydraulic oil for the oil pressure cylinder 35B is sent to the oil pressure cylinder 35B via a pipe 52B. Specifically, the load received by the ball screw nut 22D supported by the oil pressure cylinder 35B is equal to the load received by the ball screw nut 22A and the ball screw nut 22B. The pipe 52B is provided with an oil pressure indicator 38B for detecting the pressure in the pipe.

Since driving torque of the ball screw shaft 21 on one side and driving torque of the ball screw shaft 21 on the other side are controlled so as to have an equal value, the load of the ball screw nut 22C is also equal to the load of each of the three ball screw nuts 22A, 22B and 22D, so that the pressing force of injection drive can be born evenly.

Also, the load sensor carrying flange 31 has high rigidity and therefore is scarcely deformed even if an axial load is applied, so that the ball screw nut 22A attached to this flange 31 can maintain the set position with respect to the ball screw shaft 21. Also, an oil chamber of the oil pressure cylinder 35A to which the ball screw nut 22B is attached can cover a difference in pitch between the ball screw shaft 21 and the ball screw nut 22B.

Likewise, the flange 33 has high rigidity and therefore is scarcely deformed by the load, so that the ball screw nut 22C attached to the flange 33 can maintain the set position with respect to the ball screw shaft 21. Also, an oil chamber of the oil pressure cylinder 35B to which the ball screw nut 22D is attached can cover a difference in pitch between the ball screw shaft 21 and the ball screw nut 22D.

Assuming that all of the ball screw nuts 22 are supported by the oil pressure of the oil pressure cylinder 35 and the piston 36, when the ball screw shaft 21 rotates in the reverse direction and thereby the ball screw nuts 22A and 22B are moved in the direction opposite to the direction indicated by the arrow in FIG. 4, the oil pressure becomes negative, and the drawing force becomes larger than the vacuum attraction force. In this case, the oil pressure piston 36 cannot be prevented from coming off. In this ball screw device 30, one of the two (plural) ball screw nuts 22 engaging threadedly with each of the two sets of ball screw shafts 21 is installed to the moving frame 6 via the load sensor carrying flange 31 having high rigidity, or a flange 33 having the same shape as that of the flange 31 and therefore having the equivalent rigidity to that of the flange 31. Therefore, even if some load is applied when the ball screw nuts 22A and 22B are moved in the direction opposite to the direction indicated by the arrow in FIG. 4, the load can be accommodated sufficiently.

The following is a description of the operation of the electric injection driving unit and the ball screw device 30 for the injection molding machine 1 constructed as described above.

In the step of resin feed and plasticization (in the position indicated by the solid line in FIG. 4), the injection screw 7 is turned by rotating the motor 8, and resin pellets are charged from a hopper 9 and are heated while being fed, by which the resin is melted and plasticized. At the same time, two injection driving motors 11 are synchronously operated slowly to move the moving frame 6 rearward. By retreating the injection screw 7 slowly, the molten resin is accumulated at the tip end of the injection screw 7.

When the accumulation of resin for one shot to a mold is finished (the moving frame 6 moves to the position indicated by the two-dot chain line in FIG. 4), the operation of the injection screw rotating motor 8 is stopped, and two injection driving motors 11 are synchronously operated at a high speed, by which the injection screw 7 is moved at a high speed to inject the molten resin into a cavity of the mold (returns to the position indicated by the solid line in FIG. 4). Thereafter, the process proceeds to the step of resin feed and plasticization for the next cycle, and the same process is repeated.

Since the configuration is such that in the step of injection that requires a large force, the ball screw shaft 21 is on the tension side, so that there is no fear of deflection of the ball screw shaft 21 (if the ball screw shaft 21 is on the compression side, unstable bending (buckling) is liable to occur). Also, the working force in the return direction of the moving frame 6 is far smaller than the working force at the time of injection, so that steady operation can be attained even if there is no support of bearing in the rear end portion of the ball screw shaft 21.

When one ball screw nut 22C, 22D of the two sets of ball screw nuts arranged on two sets of ball screw shafts 21 in series is installed to the moving frame 6 by interposing the oil pressure cylinder function, the pressure of hydraulic oil is controlled so as to have a load value equal to the load of the fixed load sensor carrying frame 31, so that all of the ball screw nuts 22A, 22B, 22C and 22D can be made to bear the equal load.

In this embodiment, the construction in which two sets of ball screw nuts 22 are arranged on one ball screw shaft 21 in series has been explained. However, a construction in which three or more sets of ball screw nuts 22 are arranged on one ball screw shaft 21 in series and the additional ball screw nuts are installed to the moving frame 6 by interposing an oil pressure cylinder function can also achieve the same operation as described above. In this case, each of the ball screw nuts 22 bears a load divided equally by the number of ball screw nuts 22. Also, a construction in which three or more sets of ball screw shafts 21 are assembled for injection drive, one of ball screw nuts of one ball screw shaft of these ball screw shafts is installed to the moving frame 6 via the load sensor carrying frame 31, one of ball screw nuts of the other ball screw shafts is installed to the moving frame 6 via the flange 33, and all other ball screw nuts are installed to the moving frame 6 by interposing an oil pressure cylinder function can also achieve the same operation as described above. In this case, each of the ball screw nuts 22 bears a load divided equally by the total number of ball screw nuts 22. Since each of the ball screw nuts 22 is provided with the PID control circuit 42 for independently controlling the oil pressure of the ball screw nut 22, the conversion ratio of detected value of the load sensor 32 is changed as necessary in the oil pressure conversion/distribution circuit 45, and a separate oil pressure is specified to the oil pressure cylinder 35A and the oil pressure cylinder 35B, whereby the control can be carried out.

[Third Embodiment]

A third embodiment of the present invention will be described with reference to FIG. 6. This embodiment differs from the second embodiment in the oil pressure control circuit of ball screw nut attached to the moving frame 6 by interposing an oil pressure cylinder function in the second embodiment and the control method, and all other configurations of this embodiment are the same as those of the second embodiment. Therefore, the explanation of the common configuration is omitted.

Figure 6:
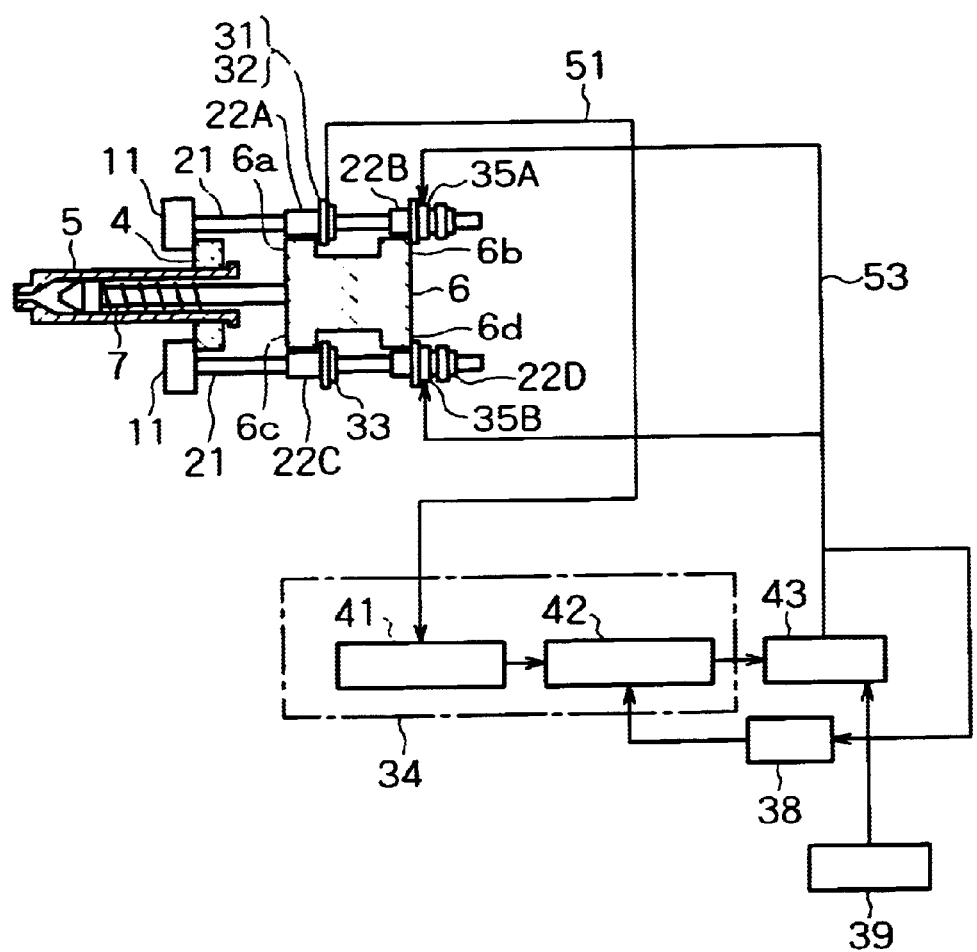
FIG. 6 is a schematic view of an oil pressure control unit in accordance with a third embodiment of the present invention.

Referring to FIG. 6, only one PID control circuit 42 is provided following the oil pressure conversion circuit 41, and one oil pressure control valve 43 and one oil pressure indicator 38 are provided. Also, an oil pressure pipe 53 is installed commonly to the oil pressure cylinder 35A and the oil pressure cylinder 35B. Therefore, an equal oil pressure is sent to the oil pressure cylinders 35A and 35B.

As explained in the second embodiment, an equal load is applied to the paired ball screw shafts disposed symmetrically. Therefore, if in the oil pressure conversion circuit 41, the oil pressure converted from the detected value of the load sensor 32 is made such that the load of the ball screw nut 22A and the load of the ball screw nut 22B are equal to each other, the loads of all of the ball screw nuts 22A, 22B, 22C and 22D can be made even. According to this configuration, the configuration of oil pressure control circuit is simple.

[Fourth Embodiment]

A fourth embodiment of the present invention will be described with reference to FIG. 7. In this embodiment, the load sensor carrying flange 31 provided with the load sensor 32 in the second embodiment is removed and replaced with the flange 33, and a load sensor (load cell) 25 for detecting compressive load is provided in a portion in which the injection cylinder 5 of the fixed frame 4 is installed. This load sensor 25 can detect the injection pushing force of the injection screw 7 via the injection cylinder 5, so that it is necessary only that the oil pressure be controlled so that a load obtained by dividing the pushing force detected by the load sensor 25 by the total number of ball screw nuts is applied to each of the ball screw nuts. The configuration of the oil pressure control circuit of this embodiment is almost the same as that of the second embodiment, and therefore the explanation of the common configuration is omitted.

Figure 7:
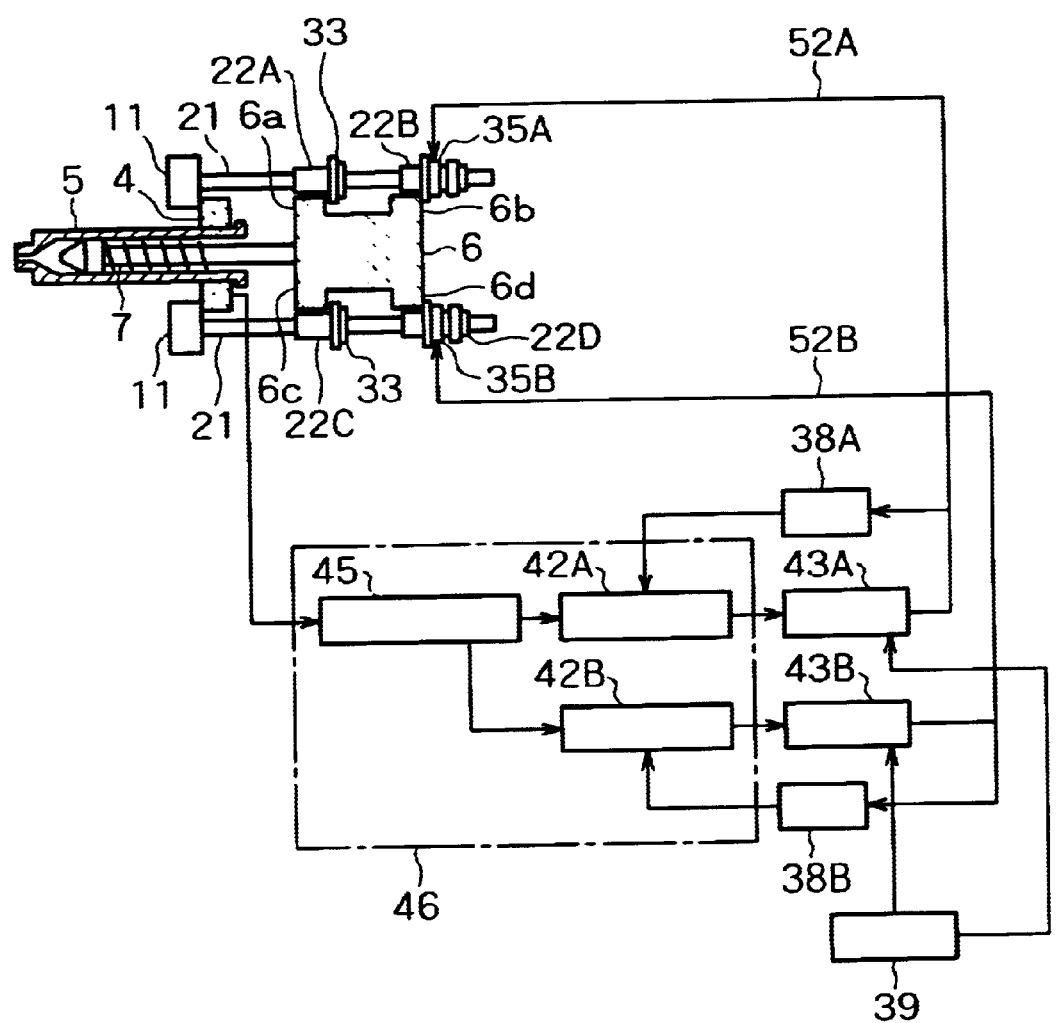
FIG. 7 is a schematic view of an oil pressure control unit in accordance with a fourth embodiment of the present invention.

Referring to FIG. 7, the oil pressure conversion/distribution circuit 45 converts the injection pushing force detected by the load sensor 25 into an oil pressure such that a load divided by the total number of ball screw nuts is applied, and the oil pressure conversion value (same value) is sent to the PID control circuit 42A and the PID control circuit 42B. The PID control circuit 42A controls the oil pressure of an oil hydraulic pump 39 via the oil pressure control valve 43A, and transmits it to the oil pressure cylinder 35A via the pipe 52A. The oil pressure indicator 38A feeds back the oil pressure of the pipe 52A to the PID control circuit 42A. Likewise, the PID control circuit 42B controls the oil pressure of the oil hydraulic pump 39 via the oil pressure control valve 43B, and transmits it to the oil pressure cylinder 35B via the pipe 52B. The oil pressure indicator 38B feeds back the oil pressure of the pipe 52B to the PID control circuit 42B.

As explained in the second embodiment, an equal load is applied to the paired ball screw shafts disposed symmetrically. Therefore, if in the oil pressure conversion/distribution circuit 45, the load value detected by the load sensor 25 is divided by the total number (four in FIG. 7) of ball screw nuts 22 and the oil pressure converted from this value is transmitted to the oil pressure cylinder 35A and the oil pressure cylinder 35B, the loads of all of the ball screw nuts 22A, 22B, 22C and 22D can be made even.

[Fifth Embodiment]

A fifth embodiment of the present invention will be described with reference to FIG. 8. This embodiment differs from the fourth embodiment in the oil pressure control circuit of ball screw nut attached to the moving frame 6 by interposing an oil pressure cylinder function in the fourth embodiment and the control method, and all other configurations of this embodiment are the same as those of the fourth embodiment. Therefore, the explanation of the common configuration is omitted.

Figure 8:
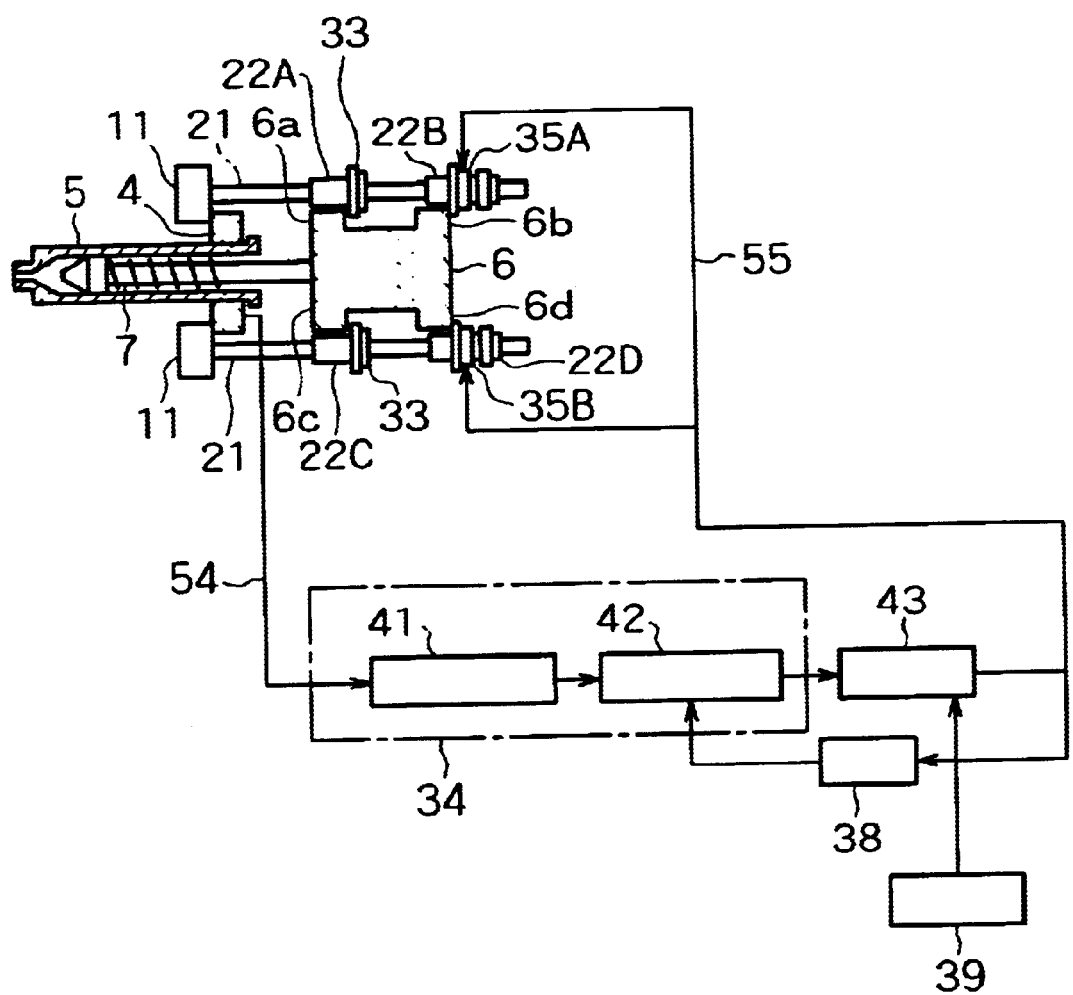
FIG. 8 is a schematic view of an oil pressure control unit in accordance with a fifth embodiment of the present invention.

Referring to FIG. 8, only one PID control circuit 42 is provided following the oil pressure conversion circuit 41, and one oil pressure control valve 43 and one oil pressure indicator 38 are provided. Also, an oil pressure pipe 55 is installed commonly to the oil pressure cylinder 35A and the oil pressure cylinder 35B. Therefore, an equal oil pressure is sent to the oil pressure cylinders 35A and 35B.

As explained in the above-described embodiment, an equal load is applied to the paired ball screw shafts disposed symmetrically. Therefore, if in the oil pressure conversion circuit 41, the load value detected by the load sensor 25 is divided by the total number (four in FIG. 8) of ball screw nuts 22 and the oil pressure converted from this value is transmitted to the oil pressure cylinder 35A of the ball screw nut 22B and the oil pressure cylinder 35B of the ball screw nut 22D, the loads of all of the ball screw nuts 22A, 22B, 22C and 22D can be made even. According to this configuration, the configuration of oil pressure control circuit is simple.

Next, embodiments of the present invention of another aspect will be described.

[First Embodiment]

Figure 11:
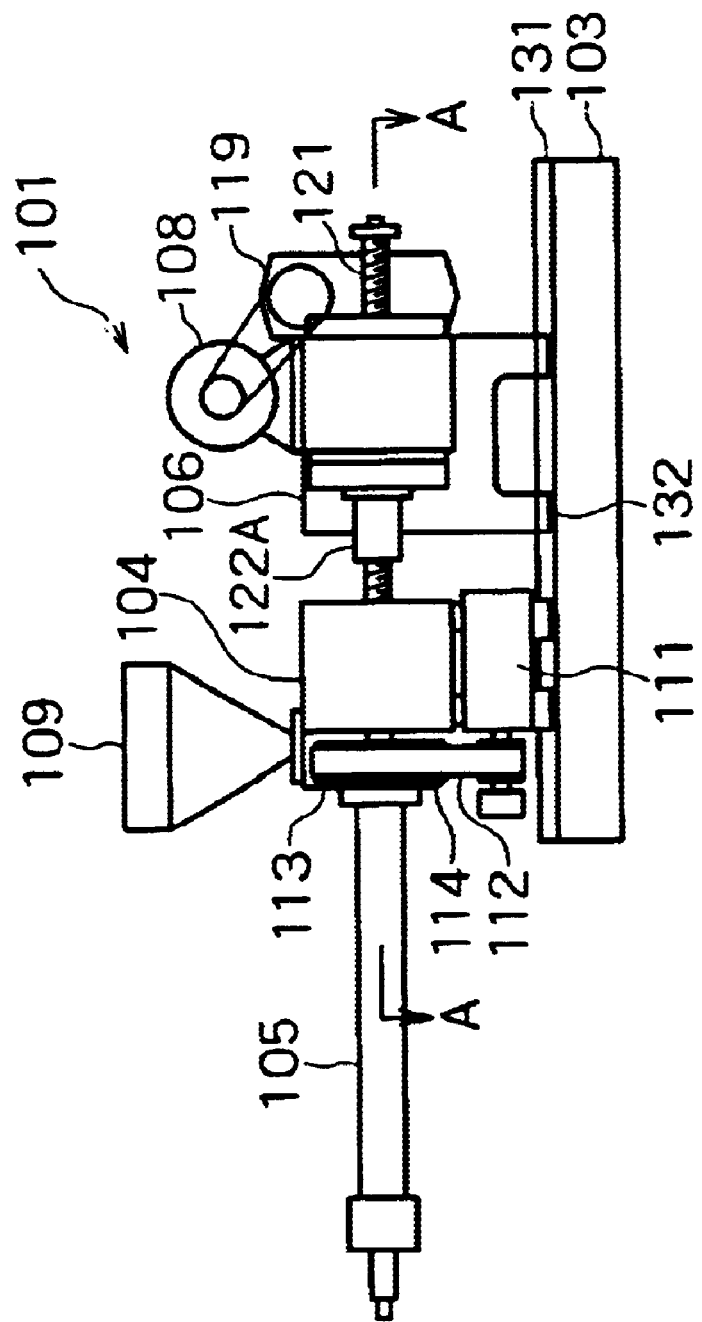
FIG. 11 is a general side view of an injection unit using the ball screw device of the embodiment shown in FIG. 10.
Figure 12:
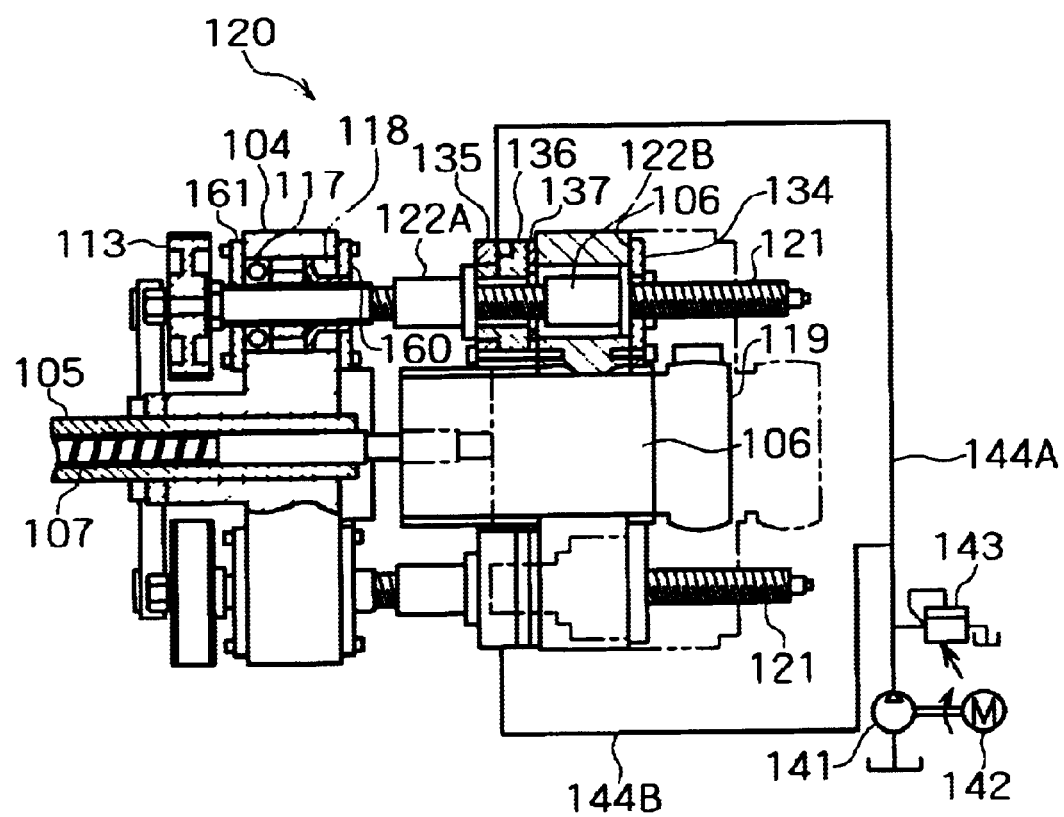
FIG. 12 is a partially sectioned plan view of the injection unit shown in FIG. 11, including a hydraulic system diagram for the ball screw device.

A first embodiment of the present invention will be described with reference to the accompanying drawings. FIG. 10 is a side sectional view showing the construction of a ball screw device, FIG. 11 is a general side view of an injection unit using the ball screw device shown in FIG. 10, FIG. 12 is a partially sectioned plan view of the injection unit shown in FIG. 11, including a hydraulic system diagram for the ball screw device, FIG. 13 is a graph showing loads of two ball screw nuts with respect to a load of a ball screw shaft of the ball screw device shown in FIG. 10, FIG. 14-(I) is a schematic view of the ball screw device shown in FIG. 10, and FIGS. 14-(II) and 14-(III) are graphs showing a load received by a ball with respect to the axial direction of a ball screw nut.

A ball screw device 120 shown in FIG. 10 includes a ball screw shaft 121, two sets of a (first) ball screw nut 122A and a (second) ball screw nut 122B engaging threadedly with the shaft 121, an oil pressure cylinder 135 and an oil pressure piston 136 which are interposed between the ball screw nut 122A and a moving frame (working body) 106 when the ball screw nut 122A is installed, a seat 137 for fixedly connecting the oil pressure cylinder 135 to the moving frame 106, many bolts 138 for installing the oil pressure cylinder 135 to the moving frame 106, and an attachment disk 134 for installing the ball screw nut 122B to the moving frame 106. The oil pressure piston 136 is fitted in the oil pressure cylinder 135 in a fluid-tight manner and is capable of sliding, and an oil pressure chamber r formed by the oil pressure piston 136 and the oil pressure cylinder 135 is connected with an oil pressure pipe 144A. Some of the bolts 138 are also used as a detent for the ball screw nut 122A.

Figure 13:
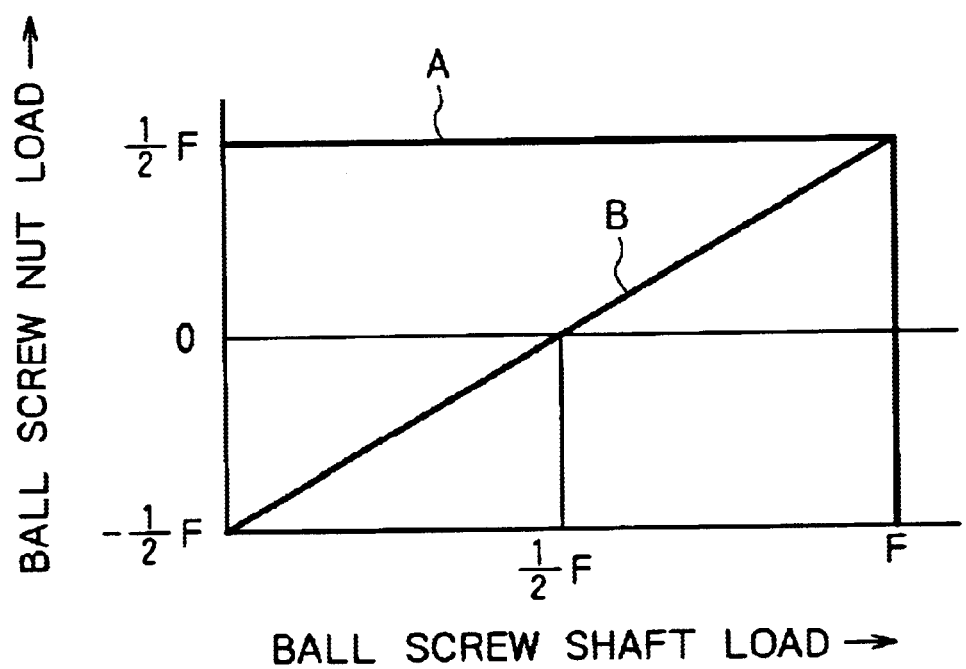
FIG. 13 is a graph showing loads of two ball screw nuts with respect to a load of a ball screw shaft of the ball screw device shown in FIG. 10.

The loads of two ball screw nuts 122A and 122B with respect to the load of the ball screw shaft 121 will be explained with reference to the graph of FIG. 13 showing the loads of two ball screw nuts. The abscissas of FIG. 13 represent the load of the ball screw shaft 121 and the ordinates represent the loads of the ball screw nut 122A (horizontal straight line A in the figure) and the ball screw nut 122B (oblique line B in the figure). A high pressure is applied to the ring-shaped oil pressure chamber r through the oil pressure pipe 144A. If a fixed load ½F is always applied to the ball screw nut 122A via the oil pressure piston 136 (horizontal straight line A), when no load is applied to the ball screw shaft 121 from the outside (left end in FIG. 14), the reaction force (½F) of oil pressure in the oil pressure chamber r passes through the oil pressure cylinder 135 and the moving frame 106, and is transmitted to the ball screw nut 122B via the attachment disk 134, so that the ball screw shaft 121 is pulled by a force of ½F in the opposite direction by the ball screw nut 122A and the ball screw nut 122B. The ball screw nut 122B is pulled in the direction opposite to the load direction of the ball screw shaft 121 (−½F), but this force does not act on the outside.

Next, if a tensile force ½F is applied to the ball screw shaft 121 in the direction indicated by the arrow in FIG. 10, as shown in the center of FIG. 13, the tensile force of the ball screw shaft 121 is borne by the ball screw nut 122A only, and the force applied to the ball screw nut 122B is zero.

Further, when the maximum load F is applied to the ball screw shaft 121 in the arrow-marked direction, as shown at the right end of FIG. 13, the ball screw nut 122A and the ball screw nut 122B bear an equal force ½F evenly.

If the configuration is made such that the pushing force of ½ of the maximum load is always applied to the ball screw nut 122A in this manner, at the time of maximum load, two ball screw nuts 122A and 122B each can bear a half of the maximum load.

Figure 14:
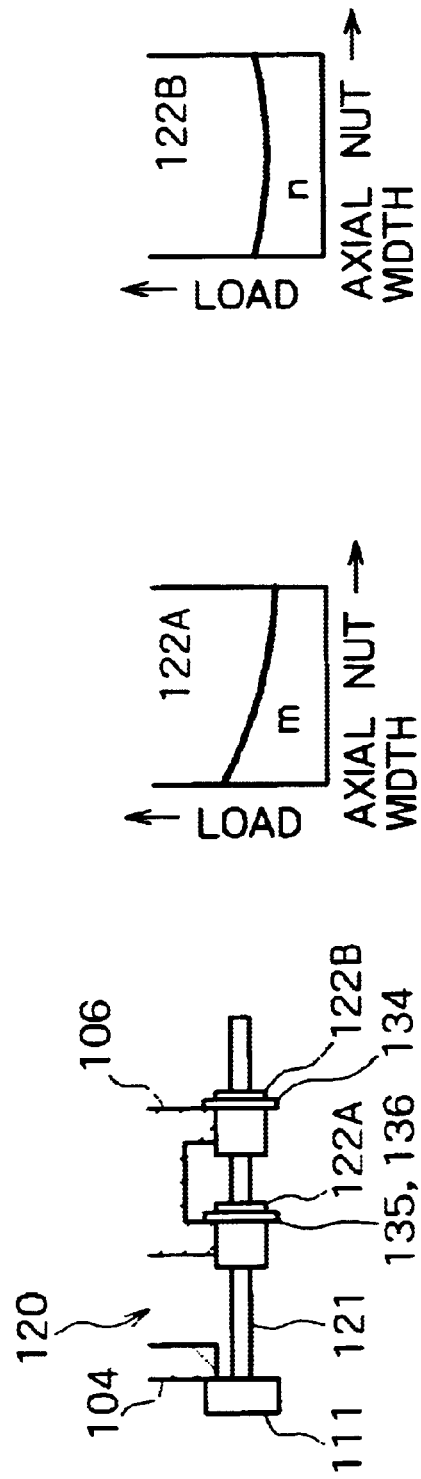
FIG. 14-(I) is a schematic view of the ball screw device shown in FIG. 10.

Also, if as shown in FIG. 14-(I), the ball screw nuts 122A and 122B are arranged in series and the ball screw nut 122A and the ball screw nut 122B each bear a half of the load, the calculated values of load received by a ball with respect to the axial direction are as shown in FIG. 14-(II) and FIG. 14-(III), and are equal to areas m and n obtained by integrating the load received by the ball in the axial direction. Comparing FIG. 14-(II) and FIG. 14-(III) showing the load received by the ball with FIG. 19-(II) showing the calculated value of a load received by the ball with respect to the axial direction of the conventional screw nut 011 shown in FIG. 18, it is found that the maximum value of the load received by the ball is apparently small.

Next, the outline of an injection unit 101 using two sets of the above-described ball screw devices 120 and the construction of the ball screw device 120 and its surroundings will be described with reference to FIGS. 11 and 12. This injection unit 101 performs resin feed of an injection screw 107 and plasticization by means of the dive of an electric motor 108, and at the same time, converts the rotation of two servomotors 111 provided separately into linear motion while carrying out synchronous control, by which the two linear motions are applied to the injection screw 107 at the same time to effect injection advance and retreat.

Referring to FIGS. 11 and 12, a fixed frame 104 is provided on a driving unit base 103, and the proximal portion of an injection cylinder 105 is installed to the side of the fixed frame 104. The moving frame 106 is constructed so as to be movable in the horizontal injection direction via a linear bearing 132 on rails 131 installed on the upper surface of the driving unit base 103. At the rear of the moving frame 106, a speed reducer 119 for rotationally driving the injection screw 107 (for resin feed and plasticization) is installed. The speed reducer 119 is driven by the motor 108 installed above the moving frame 106.

The ball screw shaft 121, 121 of the ball screw device 120 is installed to the fixed frame 104 via a high-capacity tapered roller bearing 118, a ball bearing 117, and bearing covers 160 and 161 so as to be rotatable and capable of bearing a large thrust. Below the fixed frame 104 are installed the paired servomotors 111, 111 for injection drive, and a small pulley 112 is installed on the output shaft of each of the servomotors 111 in such a manner that the direction of rotation is restricted. A driving force is transmitted from this small pulley 112 to a large pulley 113 fixedly provided on the paired ball screw shafts 121, 121 by a toothed belt 114. Also, on the output shaft of each of the servomotors 111, a separate pulley with the same diameter is fixedly provided, and a separate toothed belt is set around this pulley with the same diameter, by which the output shafts of both of the servomotors 111 are rotated synchronously.

The hydraulic oil fed under pressure into the oil pressure chamber r surrounded by the oil pressure piston 136 installed to the ball screw nut 122A and the oil pressure cylinder 135 regulates the pressure oil sent from an oil hydraulic pump 141 with a small oil feed amount, which is rotationally driven by a motor 142 to a predetermined pressure by an oil pressure regulating valve 143, and is sent through oil pressure pipes 144A and 144B.

The ball screw nut 122A is subjected to a fixed pre-load, and the ball screw nut 122B is subjected to a load in the minus (compression) direction, having the same load value. When a load is generated and becomes a load in the plus (tension) direction, the ball moves by an amount of ball movement between screw shaft grooves between the ball screw shafts 121 and ball deformation due to load. Any parts constituting the ball screw have high rigidity, and the distance of travel due to a change in load is small, so that the length of the oil pressure chamber r has only to be very small. Therefore, a gap e (see FIG. 10) formed between the oil pressure piston 136 and the seat 137 has only to be small.

The following is a description of the operation of the ball screw device 120 for the injection unit 101 constructed as described above.

In the step of resin feed and plasticization (in the position indicated by the solid line in FIG. 12), the injection screw 107 is turned by rotating the motor 108, and resin pellets are charged from a hopper 109 and are heated while being fed, by which the resin is melted and plasticized. At the same time, two injection driving motors 111 are synchronously operated slowly to move the moving frame 106 rearward. By retreating the injection screw 107 slowly, the molten resin is accumulated at the tip end of the injection screw 107.

When the accumulation of resin for one shot to a mold is finished (the moving frame 106 moves to the position indicated by the two-dot chain line in FIG. 12), the operation of the injection screw rotating motor 108 is stopped, and two injection driving motors 111 are synchronously operated at a high speed, by which the injection screw 107 is moved at a high speed to inject the molten resin into a cavity of the mold (returns to the position indicated by the solid line in FIG. 12). Thereafter, the process proceeds to the step of resin feed and plasticization for the next cycle, and the same process is repeated.

Since the configuration is such that in the step of injection that requires a large force, the ball screw shaft 121 is on the tension side, so that there is no fear of deflection of the ball screw shaft 121 (if the ball screw shaft 121 is on the compression side, unstable bending (buckling) is liable to occur). Also, the working force in the return direction of the moving frame 106 is smaller than the working force at the time of injection, so that steady operation can be attained even if there is no support of bearing in the rear end portion of the ball screw shaft 121.

One of the ball screw nuts of each of the ball screw shafts is attached to the moving frame via a fixed flange, and a pre-load is always applied to between the ball screw nut and the moving frame. Therefore, when the moving frame 106 returns to the original position, the reproducibility of the position of the ball screw nut 122 with respect to the ball screw shaft 121 can be maintained.

Also, an error of attachment angle between the ball screw shaft 121 and the ball screw nut 122A can be covered by the oil pressure chamber r of the oil pressure cylinder 135 to which the ball screw nut 122A is attached.

Thus, by the simple configuration such that a fixed pre-load is applied by means of oil pressure to one ball screw nut 122A, 122A of two sets of ball screw nuts each arranged in series on the ball screw shaft 121 of two sets of ball screw devices 120, the load on the ball screw nut can be shared when the load is at the maximum.

[Second Embodiment]

Figure 15:
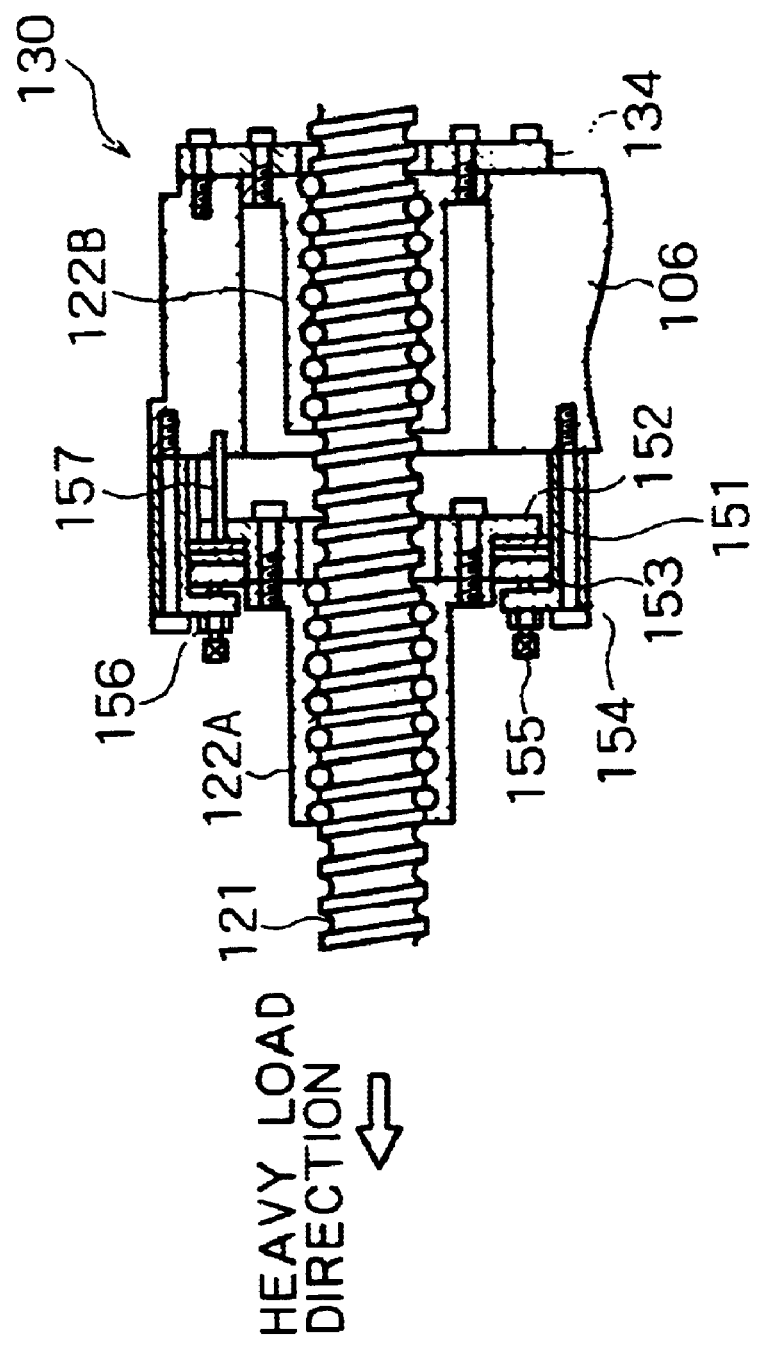
FIG. 15 is a side sectional view of a ball screw device in accordance with a second embodiment of another aspect of the present invention.

In a second embodiment of the present invention, in place of the function such that a pre-load is applied by means of oil pressure to the ball screw nut on one side in the first embodiment, an elastic element is interposed between the ball screw nut on one side and the working body (moving frame 106), and a pre-load is applied to the elastic element, by which a function similar to the function of the first embodiment is provided. The construction and function will be explained with reference to FIG. 15, which is a side sectional view of a ball screw device.

A ball screw device 130 includes the ball screw shaft 121, the ball screw nut 122A and the ball screw nut 122B engaging threadedly with the ball screw shaft 121, a ring-shaped elastic element 151, a support ring 152 which is attached to the ball screw nut 122A to support the elastic element 151, a cover ring 153 for the elastic element 151, a press member 154 installed to the moving frame 106, an adjustment screw 155 engaging threadedly with the press member 154 and a lock nut 156, a stopper pin 157 which is installed in the moving frame 106 to stop the free rotation of the ball screw nut 122A, and an attachment disk 134 which installs the ball screw nut 122B on the rear side of the moving frame 106.

The screw pitches of the ball screw shaft 121, the ball screw nut 122A, and the ball screw nut 122B in the ball screw device 130 are caused to coincide with each other, and parts are installed without a gap and assembled. Thereafter, the adjustment screw 155 is turned to press the cover ring 153. After the elastic element 151 is compressed until a predetermined compressive force is reached, the adjustment screw 155 is locked by the lock nut 156. The ball screw device 130 in which a pre-load is applied to the ball screw nut 122A and the ball screw nut 122B has the same function as that of the ball screw device 120 of the first embodiment. Therefore, the explanation other than the above is omitted.

[Third Embodiment]

In a third embodiment of the present invention, a control unit that controls an electromagnetic valve for switching a pressure oil by means of a detected value of a load sensor, which is mounted on a bearing cover receiving a thrust of the ball screw shaft, is added to the first embodiment.

Figure 16:
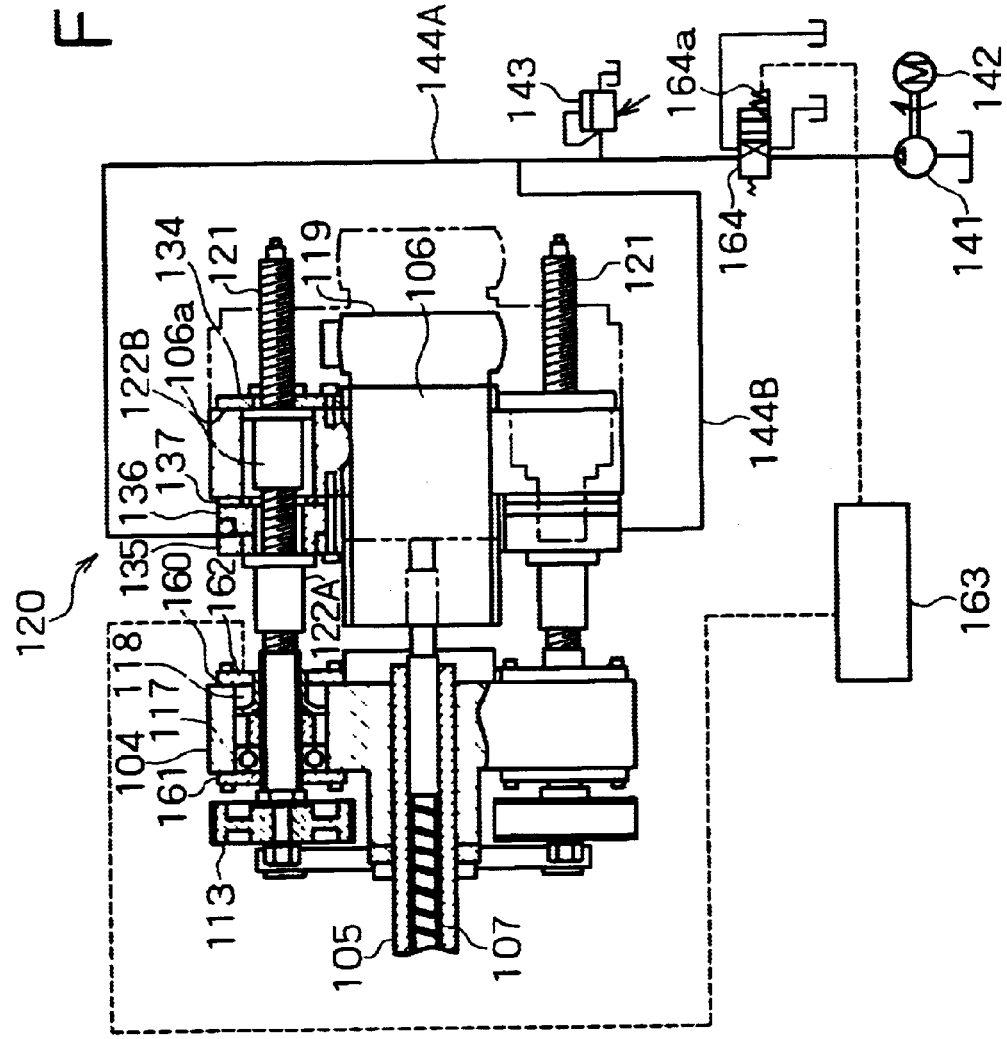
FIG. 16 is a partially sectioned plan view of an injection unit in accordance with a third embodiment of another aspect of the present invention, including a hydraulic system diagram for the ball screw device.
Figure 17:
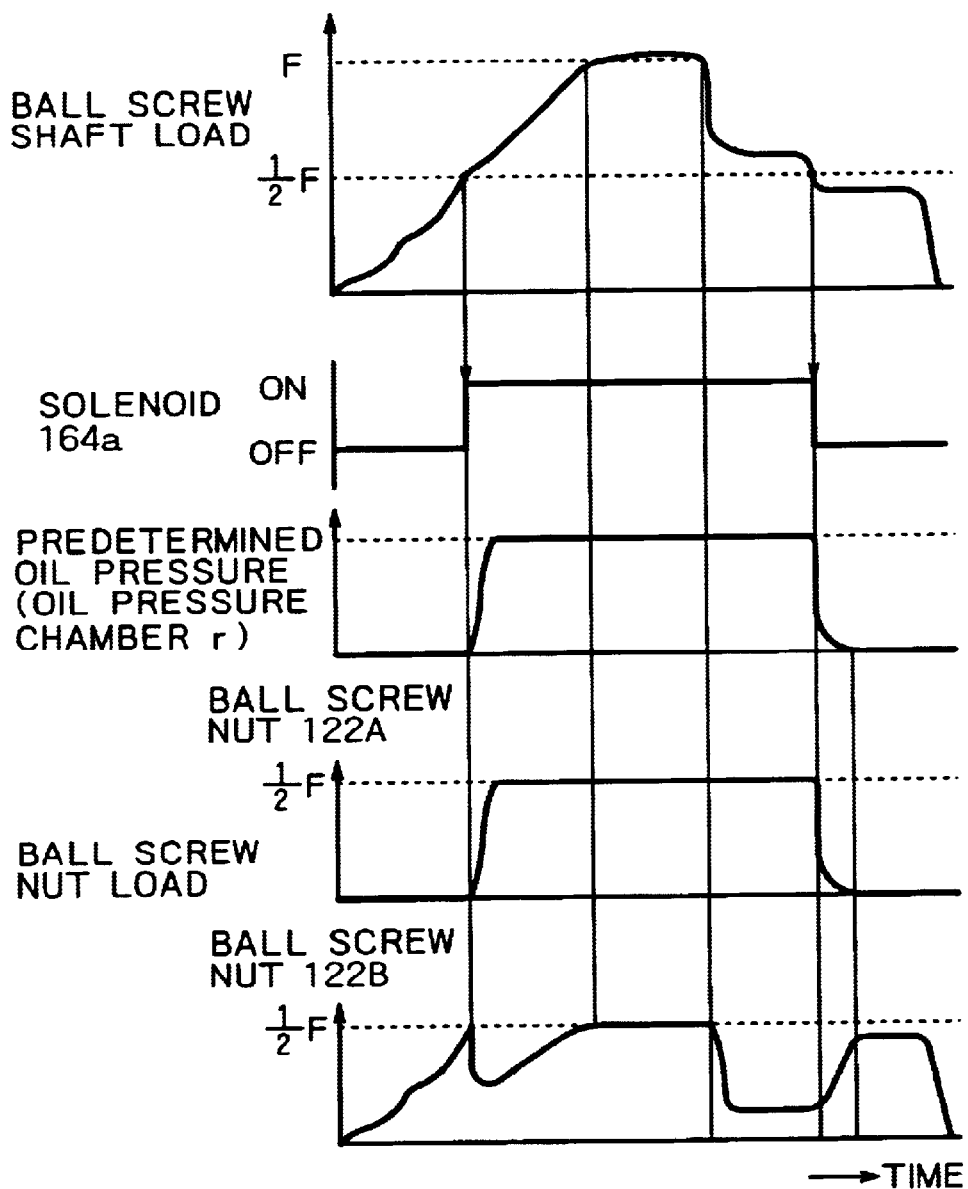
FIG. 17 is a graph showing a load of a ball screw shaft and a load applied to a ball screw nut in FIG. 16.

The construction and function of the control unit will be described with reference to FIG. 16, which is a partially sectioned plan view of the injection unit, and FIG. 17, which is a graph showing a load of the ball screw shaft and a load applied to the ball screw nut.

A load sensor (load cell) 162 is mounted on a bearing cover 160 which receives a thrust of the ball screw shaft 121. The output of the load sensor 162, which is the detected value of a load applied to the ball screw shaft 121, is sent to a control unit 163. As shown in FIG. 17, when the load applied to the ball screw shaft 121 exceeds ½ of the maximum load F, a solenoid 164a of an electromagnetic valve 164 is excited, so that the pressure oil sent from the oil hydraulic pump 141 having a small oil feed amount, which is turned by the motor 142, is regulated to a predetermined pressure by the oil pressure regulating valve 143, and is sent to the oil pressure chamber r, which is surrounded by the oil pressure piston 136 and the oil pressure cylinder 135, through the oil pressure pipes 144A and 144B, whereby a fixed load (pre-load) is applied to the ball screw nut 122A.

Therefore, the ball screw nut 122B bears a load which is smaller a fixed amount than the load of the ball screw nut 122A. At the time of the maximum load, each of the ball screw nuts 122A and 122B bears a half of the maximum load.

When the load applied to the ball screw shaft 121 is ½ or less of the maximum load, the solenoid 164a of the electromagnetic valve 164 is switched to a non-excited state, so that the pressure oil in the oil pressure chamber r drains into a tank through the electromagnetic valve 164, whereby no load is applied to the ball screw nut 122A.

The pre-load described in the above embodiments should preferably be in the range of 40 to 50% of the maximum load.

What is claimed is:

1. A ball screw device which converts the rotation of a ball screw shaft, whose thrust direction is restrained by a fixed member into linear movement of at least a first and a second ball screw nut engaging threadedly with said ball screw shaft to move a working body connected to said ball screw nuts, said ball screw device comprising:

a sensor carrying flange which attaches first ball screw nut to said working body; a load sensor which is mounted on said sensor carrying flange; an annular fluid pressure piston which is attached to said second ball screw nut; a fluid pressure cylinder which is attached to said working body and is open on one side, having an annular groove portion in which said piston fits in a fluid-tight manner to form a fluid pressure actuator, and a fluid pressure control unit which is provided on said fluid pressure cylinder to control the fluid pressure so as to produce a piston pushing force equal to the detected load of said load sensor, so that a load applied to said working body is distributed evenly to said at least first and second ball screw nuts.

2. A ball screw device of at least a first and a second row, in which at least a first and a second ball screw shaft, whose thrust direction is restrained by a fixed member, are provided in parallel, said ball screw shafts are rotated synchronously to be subjected to an even load, and a working body connected to a at least a first and second set of a first and a second ball screw nut engaging threadedly with said first and second ball screw shafts, respectively, are moved linearly, said ball screw devise comprising:

a sensor carrying flange which attaches at least said first ball screw nut from said first set to a working body; a load sensor which is mounted on said sensor carrying flange; an attachment flange which directly attaches said working body to said first ball screw nut from said second set; an annular fluid pressure piston which is attached to at least said second ball screw from said first set; a plurality of fluid pressure cylinders, each of which is attached to said working body and has an annular groove portion in which said piston fits in a fluid-tight manner to form a fluid pressure actuator; a fluid pressure control unit which controls each fluid pressure of each of said cylinders so as to produce a piston pushing force equal to the detected load of said load sensor; and a pipe which transmits the fluid pressure controlled by said fluid pressure control unit to said fluid pressure cylinders, so that a load applied to said working body distributed evenly to said ball screw nuts.

3. The ball screw device according to claim 2, wherein the fluid pressure sent to each of said fluid pressure cylinders is controlled so that a piston pushing force equal to the detected load of said load sensor is produced, the fluid pressure pipes to each cylinder are caused to communicate with each other so that an equal fluid pressure is applied to each of said cylinders, so that a load is applied to said working body; is distributed evenly to said ball screw nuts.

4. A ball screw device which converts the rotation of a ball screw shaft, whose thrust direction is restrained by a fixed member into linear movement of a at least a first and a second ball screw nut engaging threadedly with said ball screw shaft to move a working body connected to said ball screw nut, said ball screw device comprising:

a load sensor which is installed on said working body or said fixed member to detect a load on said working body; an attachment flange which directly connects said first ball screw nut to said working body; an annular fluid pressure piston attached to said second ball screw; a plurality of fluid pressure cylinders, each of which is attached to said working body and has an annular groove portion in which said piston fits in a fluid-tight manner to form a fluid pressure actuator; and a fluid pressure control unit which controls the fluid pressure of each of said fluid pressure cylinders so as to produce a piston pushing force equal to a value obtained by dividing the load detected by the load sensor of said working body by the number of ball screw nuts, so that a load is applied to said working body is distributed evenly to said ball screw nuts.

5. A ball screw device of at least a first and a second row, in which at least a first and a second ball screw shaft, whose thrust direction is restrained by a fixed member, are provided in parallel, said ball screw shafts are rotated synchronously to be subjected to an even load, and a working body connected to at least a first and a second set of a first and a second ball screw nut engaging threadedly with said first and second ball screw shafts, respectively, are moved linearly, said ball screw devise comprising:

a load sensor which is installed on said working body or said fixed member to detect a load on said working body; an attachment flange which directly connects at least said first ball screw nut from said first set to said working body; an annular fluid pressure piston attached to at least said second ball screw from said second set; a plurality of fluid pressure cylinders, each of which is attached to said working body and has an annular groove portion in which said piston fits in a fluid-tight manner to form a fluid pressure actuator; and a fluid pressure control unit which controls the fluid pressure of each of said fluid pressure cylinders so as to produce a piston pushing force equal to a value obtained by dividing the load detected by the load sensor of said working body by the total number of ball screw nuts, so that a load is applied to said working body is distributed evenly to said ball screw nuts.

6. The ball screw device according to claim 5, wherein a fluid pressure corresponding to a value obtained by dividing the load detected by the load sensor of said working body by the total number of ball screw nuts is calculated, fluid pressure pipes to each cylinder are caused to communicate with each other so that an equal fluid pressure is applied to each of said cylinders, and the working fluid pressure is controlled so as to have a value obtained by dividing the load detected by the load sensor by the total number of ball screw nuts, so that a load applied to said working body is distributed evenly to said ball screw shafts and said ball screw nuts.

7. An injection molding machine having a plurality of ball screw devices as recited in any one of claims 2, 3, 5 and 6, wherein said ball screw devices are provided in parallel to an injection screw shaft to effect a straight injection drive of said injection screw shaft of said injection molding machine and an evenly distributed load to all of said ball screw nuts.

8. A ball screw device which converts the rotation of a ball screw shaft, whose thrust direction is restrained by a fixed member into linear movement of a first and a second ball screw nut engaging threadedly with said ball screw shaft, having a load configuration such that the load for moving a working body connected to said ball screw nuts in the direction of one side is considerably larger than the load for moving said working body in the opposite direction, said ball screw device comprising:

said first ball screw nut provided on said working body so that an attachment flange is located on the side opposite to the heavy load direction of said ball screw shaft; an oil pressure cylinder fixedly provided on said working body; an oil pressure piston which is fitted in said oil pressure cylinder in a fluid-tight manner and is attached to said first ball screw nut; an oil pressure source which applies a predetermined oil pressure to a ring-shaped oil pressure chamber formed by said oil pressure piston and said oil pressure cylinder; and said second ball screw nut installed fixedly to said working body so that said attachment flange is located on the side opposite to the heavy load direction of said ball screw shaft, and said ring-shaped oil pressure chamber 15 filled with a working fluid of a predetermined pressure and holds it, and a pre-load of a predetermined percentage of the maximum load is always applied to said working body, so that at the time of the maximum load, said first and second ball screw nuts share the maximum load of said ball screw shaft.

9. A ball screw device which converts the rotation of a ball screw shaft, whose thrust direction is restrained by a fixed member into linear movement of a first and a second ball screw nut engaging threadedly with said ball screw shaft, having a load configuration such that the load for moving a working body connected to said ball screw nuts in the one-side direction is considerably larger than the load for moving said working body in the opposite direction, said ball screw device comprising:

said first ball screw nut provided on the front side of said working body so that an attachment flange is located on the side opposite to the heavy load direction of said ball screw shaft; an oil pressure cylinder fixedly provided on said working body; an oil pressure piston which is fitted in said oil pressure cylinder in a fluid-tight manner and is attached to said first ball screw nut; an oil pressure source which applies a predetermined oil pressure to a ring-shaped oil pressure chamber formed by said oil pressure piston and said oil pressure cylinder; and said second ball screw nut installed fixedly to the rear side of said working body so that said attachment flange is located on the side opposite to the heavy load direction of said ball screw shaft, and said ring-shaped oil pressure chamber is filled with a working fluid of a predetermined pressure and holds it, and a pre-load of 40 to 50% of the maximum load is always applied to said working body, so that at the time of the maximum load, said first and second ball screw nuts share the maximum load of said ball screw shaft.

10. A ball screw device which converts the rotation of a ball screw shaft, whose thrust direction is restrained by a fixed member into linear movement of a first and a second ball screw nut engaging threadedly with said ball screw shaft, having a load configuration such that the load for moving a working body connected to said ball screw nut in the one-side direction is considerably larger than the load for moving said working body in the opposite direction, said ball screw device comprising:

said a first ball screw nut provided on said working body so that an attachment flange is located on the side opposite to the heavy load direction of said ball screw shaft; an elastic element provided so as to be held between said working body and a ring plate attached to said first ball screw nut; and a said second ball screw nut installed fixedly to said working body so that said attachment flange is located on the side opposite to the heavy load direction of said ball screw shaft, and said elastic element is installed in a pre-loaded state so that the compressive force is a predetermined percentage of the maximum load, and, at the time of the maximum load, said two ball screw nuts share the maximum load of said ball screw shaft.

11. A ball screw device which converts the rotation of a ball screw shaft, whose thrust direction is restrained by a fixed member into linear movement of a first and a second ball screw nut engaging threadedly with said ball screw shaft, having a load configuration such that the load for moving a working body connected to said ball screw nuts in the one-side direction is considerably larger than the load for moving said working body in the opposite direction, said ball screw device comprising:

said first ball screw nut provided on the front side of said working body so that an attachment flange is located on the side opposite to the heavy load direction of said ball screw shaft; an elastic element provided so as to be held between said working body and a ring plate attached to said first ball screw nut; and said second ball screw nut installed fixedly to the rear side of said working body so that said attachment flange is located on the side opposite to the heavy load direction of said ball screw shaft, and said elastic element is installed in a pre-loaded state so that the compressive force is 40 to 50% of the maximum load and, at the time of the maximum load, said two ball screw nuts share the maximum load of said ball screw shaft.

12. The ball screw device according to claim 9, wherein said ball screw device further comprises a load sensor installed on a member subjected to the load of said ball screw shaft; and a control valve for controlling a pressure oil sent to said ring-shaped oil pressure chamber on the basis of the detected value of said sensor, and, when the detected value is 1/2 (50%) or more of the maximum load, said oil pressure chamber is filled with the pressure oil of a predetermined pressure and holds it, and 40 to 50% of the maximum load is applied to said working body, whereby, at the time of the maximum load, said two ball screw nuts share the maximum load of said ball screw shaft.

13. An injection molding machine having a plurality of ball screw devices as recited in any one of claims 8 to 12, wherein said ball screw devices are provided in parallel to an injection screw shaft to effect a straight injection drive of an injection screw of said injection molding machine, and an evenly distributed load to all of said ball screw nuts.

* * * * *